US009988482B2

(12) United States Patent
Burckhardt et al.

(10) Patent No.: US 9,988,482 B2
(45) Date of Patent: Jun. 5, 2018

(54) CROSSLINKING CATALYST COMPRISING SILOXANE STRUCTURAL UNITS

(71) Applicant: SIKA TECHNOLOGY AG, Baar (CH)

(72) Inventors: Urs Burckhardt, Zürich (CH); Rita Cannas, Dübendorf (CH)

(73) Assignee: SIKA TECHNOLOGY AG, Baar (CH)

(*) Notice: Subject to any disclaimer, the term of this patent is extended or adjusted under 35 U.S.C. 154(b) by 0 days. days.

(21) Appl. No.: 15/319,215

(22) PCT Filed: Jun. 15, 2015

(86) PCT No.: PCT/EP2015/063253
§ 371 (c)(1),
(2) Date: Dec. 15, 2016

(87) PCT Pub. No.: WO2015/193208
PCT Pub. Date: Dec. 23, 2015

(65) Prior Publication Data
US 2017/0129987 A1     May 11, 2017

(30) Foreign Application Priority Data

Jun. 16, 2014 (EP) .................................... 14172599

(51) Int. Cl.
C08G 77/08      (2006.01)
C08G 18/18      (2006.01)
B01J 31/02      (2006.01)
C08G 18/83      (2006.01)
C08G 18/75      (2006.01)
C08G 18/48      (2006.01)
C08G 77/38      (2006.01)

(52) U.S. Cl.
CPC ...... C08G 18/1858 (2013.01); B01J 31/0247 (2013.01); B01J 31/0251 (2013.01); B01J 31/0274 (2013.01); C08G 18/1841 (2013.01); C08G 18/4825 (2013.01); C08G 18/755 (2013.01); C08G 18/837 (2013.01); C08G 77/08 (2013.01); C08G 77/38 (2013.01)

(58) Field of Classification Search
None
See application file for complete search history.

(56) References Cited

U.S. PATENT DOCUMENTS

| | | | | | |
|---|---|---|---|---|---|
| 3,373,137 | A | * | 3/1968 | Saam | C07F 7/0812 528/12 |
| 4,797,439 | A | * | 1/1989 | Peccoux | C08K 5/5442 524/188 |
| 5,364,955 | A | | 11/1994 | Zwiener et al. | |
| 5,496,478 | A | * | 3/1996 | Fost | A61K 8/898 508/204 |
| 5,580,943 | A | * | 12/1996 | Nakashima | C07F 7/0854 528/26 |
| 5,677,269 | A | * | 10/1997 | Fost | A61K 8/898 508/210 |
| 5,840,805 | A | * | 11/1998 | Nakashima | C08L 83/04 524/424 |
| 7,825,207 | B2 | * | 11/2010 | Ferenz | A61K 8/43 424/70.122 |
| 9,493,691 | B2 | * | 11/2016 | Patel | C08G 77/455 |
| 2011/0046299 | A1 | | 2/2011 | Maliverney et al. | |
| 2012/0097883 | A1 | * | 4/2012 | Henning | C08G 77/26 252/8.63 |
| 2015/0057412 | A1 | * | 2/2015 | Knott | C07F 7/21 524/858 |

FOREIGN PATENT DOCUMENTS

JP    2010-214345 A    9/2010

OTHER PUBLICATIONS

Dec. 20, 2016 International Preliminary Report on Patentability issued in International Patent Application No. PCT/EP2015/063253.
Balbino et al., "Silica-supported guanidine catalyst for continuous flow biodiesel production," Green Chemistry, 2011, vol. 13, No. 11, pp. 3111-3116.
Voronkov et al., "Mono- and Bis-N-[3-(triorganylsilyl)propyl]guanidines and Their Derivatives," Russian Journal of General Chemistry, 2003, vol. 73, No. 8, pp. 1239-1242.
Dec. 11, 2015 International Search Report issued in International Patent Application No. PCT/EP2015/063253.

* cited by examiner

Primary Examiner — Robert S Loewe
(74) Attorney, Agent, or Firm — Oliff PLC

(57) ABSTRACT

A catalyst containing at least one amidine or guanidine group of formula (Ia) or (Ib), which is bound to a silicon atom of a siloxane residue. At room temperature, the catalyst is liquid and odorless. It is particularly suitable as a cross-linking catalyst for curable compositions, in particular for silane group-containing compositions. It is particularly good at accelerating the hardening of such compositions without impairing stability in storage, and displays little volatility but good compatibility. As a result, the compositions do not tend towards separation or migration or evaporation of the catalyst.

22 Claims, No Drawings

US 9,988,482 B2

CROSSLINKING CATALYST COMPRISING SILOXANE STRUCTURAL UNITS

TECHNICAL FIELD

The invention relates to catalysts for curable compositions, in particular for compositions containing silane groups.

PRIOR ART

Curable compositions play an important role in many technical uses, for example as adhesives, sealants or coatings. Their curing is effected by crosslinking reactions, which proceed via free or latent reactive groups, such as, for example, isocyanate groups, epoxide groups, hydroxyl groups, amino groups or silane groups, wherein after a mixing operation, by heating or by contact with moisture these react with themselves or with one another and in this way covalently bond the builder components contained in the composition to form a polymeric network. Catalysts are often employed to accelerate such crosslinking reactions. These are very often toxicologically unacceptable substance which represent a potential risk to processors and the environment, in particular after curing of the composition if the catalyst or degradation products thereof are released by emission of gas, migration or washing out. Compositions which are based on polymers containing silane groups and are curable at room temperature are distinctly confronted with this problem. Polymers containing silane groups in this context are, in particular, polyorganosiloxanes, which are commonly called "silicone polymers" or "silicones" or "silicone rubbers", and organic polymers containing silane groups, which are also called "silane-functional polymers", "silane-modified polymers" (SMP) or "silane-terminated polymers" (STP). Their crosslinking proceeds via the condensation of silanol groups to form siloxane bonds and is conventionally catalyzed by means of organotin compounds, such as, in particular, dialkyltin(IV) carboxylates. These are distinguished by a very high activity with respect to the silanol condensation and are very stable to hydrolysis; nevertheless, they are harmful to health and highly water-polluting. They are often combined with further catalysts, chiefly with basic compounds, such as, in particular, amines, which above all accelerate the prior hydrolysis of the silane groups.

Due to a greater emphasis on EHS aspects by professional associations and consumers and stricter national regulation, for some time efforts have increasingly been undertaken to replace the organotin compounds by other, less toxic catalysts. Thus, for example, organotitanates, -zirconates and -aluminates have been described as alternative metal catalysts. However, these usually have a lower catalytic activity with respect to the silanol condensation and have the effect of a significantly slower crosslinking. Because of their lack of stability to hydrolysis they can lose a large proportion of their activity during storage of the composition due to the residual moisture of the constituents, as a result of which curing is severely slowed down or comes to a halt completely.

A further known alternative to organotin compounds are highly basic nitrogen compounds from the class of amidines and guanidines, which can be employed in combination with the metal catalysts mentioned or also by themselves. Many of the usual amidine and guanidine catalysts, such as, in particular, 1,8-diazabicyclo[5.4.0]undec-7-ene (DBU) and 1,1,3,3-tetramethylguanidine (TMG), however, are readily volatile and odor-intensive and likewise are substances which are harmful to health and pollute the environment. Furthermore, due to a low compatibility they tend to migrate into the composition and as a result to cause separation, exudation or substrate contamination. The use described of aromatic amidines and guanidines which are solid at room temperature provides a remedy here, but requires the use of suitable solvents and brings losses in catalytic activity and therefore speed of crosslinking.

DESCRIPTION OF THE INVENTION

The object of the present invention is therefore to provide a catalyst for crosslinking of curable compositions, in particular compositions containing silane groups, which has a high catalytic activity for the crosslinking reaction and therefore renders possible a rapid curing of the composition applied, and has a high selectivity for this crosslinking reaction and therefore does not excessively impair the storage stability of the composition. The catalyst should furthermore have a low vapor pressure and a high compatibility with the composition, so that it tends neither towards separation or migration nor towards evaporation, should be as odorless and of a low toxicity as possible, and should be liquid at room temperature so that it can also be employed without solvents.

This object is achieved by a catalyst as claimed in claim 1. In contrast to many amidine or guanidine catalysts known from the prior art, at room temperature it is odorless and liquid. It has a very low vapor pressure and shows a very high catalytic activity with a good selectivity, in particular in compositions containing silane groups. This is particularly surprising, since due to its relatively high molecular weight a reduced activity compared with small and therefore more mobile amidines or guanidines would be expected.

With these properties the catalyst as claimed in claim 1 is outstandingly suitable for use in curable compositions, in particular compositions containing silane groups, where as the sole catalyst or in combination with further catalysts is renders possible a rapid curing to a mechanically high performance and stable material, without impairing the storage stability of the non-cured composition. Surprisingly, both before and after curing it has an excellent compatibility with the composition and tends neither towards separation nor towards migration. It renders possible products of low emission and odor, which neither have greasy or tacky surfaces nor cause substrate contamination. Finally, the catalyst as claimed in claim 1 can be prepared from commercially available starting materials in a surprisingly simple and rapid process without auxiliary substances.

Further aspects of the invention are the subject matter of further independent claims. Particularly preferred embodiments of the invention are the subject matter of the dependent claims.

WAYS OF CARRYING OUT THE INVENTION

The invention relates to a catalyst comprising at least one amidine or guanidine group of the formula (Ia) or (Ib) which is bonded to a silicon atom of a siloxane radical

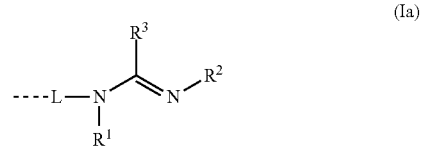
(Ia)

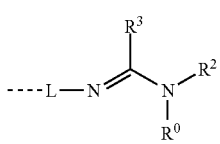

(Ib)

wherein
L represents a linear or branched, divalent hydrocarbon radical having 1 to 20 C atoms, which optionally contains one or more nitrogen atoms,
$R^1$ and $R^0$ independently of each other each represent a hydrogen radical or an alkyl or cycloalkyl or aralkyl radical having 1 to 8 C atoms,
$R^2$ represents a hydrogen radical or an alkyl, cycloalkyl or aralkyl radical having 1 to 18 C atoms, which optionally contains hetero atoms and which optionally contains terminal primary or secondary amino groups,
$R^3$ represents —$NHR^5$ or a hydrogen radical or an alkyl, cycloalkyl or aralkyl radical having 1 to 12 C atoms,
$R^5$ represents a hydrogen radical or an alkyl, cycloalkyl or aralkyl radical having 1 to 18 C atoms, which optionally contains hetero atoms, wherein
$R^1$ together with $R^2$ can also represent an alkylene radical having 2 to 6 C atoms,
$R^0$ together with $R^2$ can also represent an alkylene radical having 3 to 6 C atoms, which optionally contains hetero atoms,
$R^2$ together with $R^3$ can also represent an alkylene radical having 3 to 6 C atoms and
$R^2$ together with $R^5$ can also represent an alkylene radical having 2 to 12 C atoms.

In the present document the term "siloxane radical" means a radical containing at least one siloxane bond Si—O—Si.

"Polysiloxane radical" means a siloxane radical containing several siloxane bonds in sequence, that is to say Si—(O—Si), units, where s=2 or more.

"Siloxane-amine" means an amine, the amino groups of which are bonded to a silicon atom of a siloxane radical via an organic radical.

"Polysiloxane-amine" means an amine, the amino groups of which are bonded to a silicon atom of a polysiloxane radical via an organic radical.

The term "silane group" means a silyl group which is bonded to an organic radical or to a polysiloxane radical and has one to three, in particular two or three, hydrolyzable substituents. Alkoxy radicals are particularly common hydrolyzable substituents. These silane groups are also called "alkoxysilane groups". Silane groups can also be present in the partially or completely hydrolyzed form.

"Hydroxysilane", "isocyanatosilane", "aminosilane" or "mercaptosilane" means organoalkoxysilanes which have on the organic radical, in addition to the silane group, one or more hydroxyl, isocyanato, amino or mercapto groups.

Substance names starting with "poly", such as polyol or polyisocyanate, mean substances which formally contain two or more of the functional groups occurring in their name per molecule.

The term "organic polymer" includes a group of chemically uniform macromolecules which differ, however, with respect to degree of polymerization, molecular weight and chain length, which has been prepared by a polyreaction (polymerization, polyaddition, polycondensation) and has several carbon atoms in the polymer backbone, and reaction products of such a group of macromolecules. Polymers having a polyorganosiloxane backbone (generally called "silicones") are not organic polymers in the sense of the present document.

The term "polyether comprising silane groups" also includes organic polymers which contain silane groups and can also contain, in addition to polyether units, urethane groups, urea groups or thiourethane groups. Such polyethers containing silane groups can also be called "polyurethanes containing silane groups".

In the present document "molecular weight" is understood as meaning the molar mass (in grams per mol) of a molecule or of a part of a molecule, also called "radical". "Average molecular weight" means the number-average $M_n$ of an oligomeric or polymeric mixture of molecules or radicals, which is conventionally determined by means of gel permeation chromatography (GPC) against polystyrene as the standard.

A substance or a composition is called "storage-stable" or "stable to storage" if it can be stored at room temperature in a suitable vessel for a relatively long time, typically at least 3 months up to 6 months and more, without changing, due to the storage, in its application or use properties, in particular the viscosity and the speed of crosslinking, to an extent relevant for its use.

A broken line in the formulae in this document in each case represents the bond between a substituent and the associated molecular radical.

"Room temperature" means a temperature of approx. 23° C.

The catalyst according to the invention can also be present in a tautomeric form. All possible tautomer forms of the catalyst according to the invention are regarded as equivalent in the context of the present invention.

The catalyst according to the invention can furthermore be present in a protonated form.

The catalyst according to the invention can likewise be present in a complexed form, in particular with cations of zinc, iron or molybdenum.

If the catalyst according to the invention contains alkoxysilane groups, these can also be present in a partially or completely hydrolyzed form and therefore contain silanol groups.

Preferably, the catalyst contains 1 to 20, in particular 1 to 10, amidine or guanidine groups of the formula (Ia) or (Ib).

Preferably, the siloxane radical to which the amidine or guanidine groups of the formula (Ia) or (Ib) are bonded is a polysiloxane radical. Such a catalyst is particularly readily compatible in curable compositions, in particular those based on silicone polymers.

Such a polysiloxane radical can contain one or more aminoalkyl groups which are bonded directly to a silicon atom via a C atom.

Preferably, the siloxane radical to which the amidine or guanidine groups of the formula (Ia) or (Ib) are bonded is a polysiloxane radical having an average molecular weight in the range of from 206 to 50,000 g/mol, in particular 280 to 25,000 g/mol, particularly preferably 354 to 15,000 g/mol. A catalyst having such a polysiloxane radical is typically liquid at room temperature, has a low vapor pressure, is particularly readily compatible in curable compositions based on silicone polymers and in this context tends particularly little towards separation or migration.

Preferably, the polysiloxane radical contains 3 to 700 silicon atoms. Particularly preferably, the polysiloxane radical contains 4 to 350, in particular 5 to 200, silicon atoms. A catalyst having such a polysiloxane radical is typically liquid at room temperature, has a low vapor pressure, is particularly readily compatible in curable compositions based on silicone polymers and in this context tends particularly little towards separation or migration.

Particularly preferably, the polysiloxane radical is linear. A catalyst having a linear polysiloxane radical is of particularly low viscosity.

The preferred embodiments of the catalyst according to the invention can be easily prepared from commercially available raw materials and have particularly good properties with respect to the catalytic activity and compatibility in curable compositions, in particular compositions containing silane groups.

In a preferred embodiment of the invention the siloxane radical to which the amidine or guanidine groups of the formula (Ia) or (Ib) are bonded is a polysiloxane radical $A^1$, which contains at least one structural unit of the formula

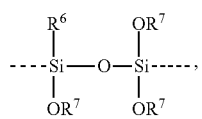

in which an amidine or guanidine group of the formula (Ia) or (Ib) is bonded directly to the dialkoxy-substituted silicon atom of this structural unit, wherein $R^6$ represents a monovalent hydrocarbon radical having 1 to 12 C atoms and $R^7$ represents a monovalent hydrocarbon radical having 1 to 4 C atoms.

Preferably, $R^6$ represents a monovalent hydrocarbon radical having 1 to 6 C atoms, in particular methyl or vinyl or phenyl, particularly preferably methyl or vinyl, in particular vinyl.

Preferably, $R^7$ represents methyl or ethyl or isopropyl, in particular methyl or ethyl.

The polysiloxane radical $A^1$ can contain in particular one or more aminoalkyl groups which are bonded directly to a silicon atom via a C atom.

The polysiloxane radical $A^1$ preferably has an average molecular weight in the range of from 206 to 10,000 g/mol, in particular 280 to 5,000 g/mol.

The polysiloxane radical $A^1$ can be linear or branched once or several times and/or contain cyclic contents. In particular, the polysiloxane radical $A^1$ is branched.

Preferably 1 to 20, in particular 1 to 10, amidine or guanidine groups of the formula (Ia) or (Ib) are bonded to the polysiloxane radical $A^1$.

A catalyst according to the invention having a polysiloxane radical $A^1$ has advantageous properties. It can easily be prepared from commercially available starting materials, has a high catalytic activity and can be covalently bonded in compositions comprising additional polymers containing silane groups during curing with moisture. On contact with moisture it can also crosslink by itself via silane groups present to give a solid material of high hardness and excellent curing properties.

In a further preferred embodiment of the invention the siloxane radical to which the amidine or guanidine groups of the formula (Ia) or (Ib) are bonded is a polysiloxane radical $A^2$ of the formula (II)

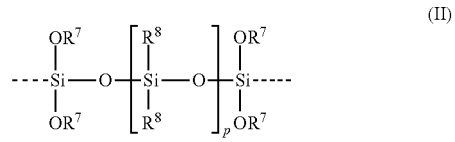

wherein
p represents an integer in the range of from 1 to 60, preferably 2 to 20, in particular 4 to 12,
$R^7$ has the meanings already mentioned and
$R^8$ represents a monovalent hydrocarbon radical having 1 to 12 C atoms.

Preferably, $R^8$ represents a monovalent hydrocarbon radical having 1 to 6 C atoms, particularly preferably methyl or phenyl, in particular methyl.

A polysiloxane radical $A^2$ preferably has an average molecular weight in the range of from 270 to 5,000 g/mol, preferably 344 to 3,000 g/mol, in particular 418 to 2,000 g/mol.

Two amidine or guanidine groups of the formula (Ia) or (Ib) are bonded to one polysiloxane radical $A^2$.

A catalyst according to the invention having a polysiloxane radical $A^2$ has advantageous properties. It can easily be prepared from commercially available starting materials, has a very low viscosity and a high catalytic activity and can be covalently bonded in compositions comprising polymers containing silane groups during curing with moisture. On contact with moisture it can also crosslink by itself via silane groups present to give a very hydrophobic, solid material with very good adhesion properties.

In a further preferred embodiment of the invention the siloxane radical to which the amidine or guanidine groups of the formula (Ia) or (Ib) are bonded is a polysiloxane radical $A^3$ of the formula (III)

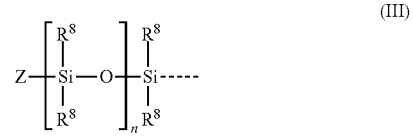

wherein
n represents an integer in the range of from 2 to 700,
$R^8$ has the meanings already mentioned and
Z represents an amidine or guanidine group of the formula (Ia) or (Ib) or an aminoalkyl group or a radical $R^9$, wherein $R^9$ represents a monovalent alkyl or alkoxy radical having 1 to 6 C atoms.

A catalyst according to the invention having a polysiloxane radical $A^3$ thus has 1 or 2 amidine or guanidine groups of the formula (Ia) or (Ib).

Preferably, n represents an integer in the range of from 5 to 350, in particular 10 to 200.

Preferably, Z represents an amidine or guanidine group of the formula (Ia) or (Ib).

The polysiloxane radical $A^3$ preferably has an average molecular weight in the range of from 206 to 50,000 g/mol, preferably 280 to 25,000 g/mol, in particular 354 to 15,000 g/mol.

A polysiloxane radical $A^3$ of the formula (III) to which 2 amidine or guanidine groups of the formula (Ia) or (Ib) are bonded is preferred.

A catalyst according to the invention having a polysiloxane radical $A^3$ has advantageous properties. It can easily be prepared from commercially available starting materials, has a surprisingly low viscosity and a high catalytic activity and an excellent compatibility in curable compositions, in particular those based on silicone polymers.

In a further preferred embodiment of the invention the siloxane radical to which the amidine or guanidine groups of the formula (Ia) or (Ib) are bonded is a polysiloxane radical $A^4$ of the formula (IV)

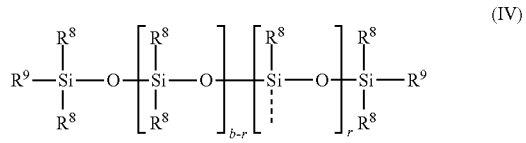

wherein
b represents an integer in the range of from 1 to 700,
r represents an integer from 1 to 20 and
$R^8$ and $R^9$ have the meanings already mentioned,
wherein the structural units having the index (b-r) and the structural units having the index r can be arranged block-wise, in alternation or randomly in the siloxane chain.

Preferably, b represents an integer in the range of from 2 to 350, in particular 5 to 200.

Preferably, r represents an integer from 1 to 10.

The polysiloxane radical $A^4$ preferably has an average molecular weight in the range of from 221 to 50,000 g/mol, preferably 295 to 25,000 g/mol, in particular 354 to 15,000 g/mol.

A catalyst having a polysiloxane radical $A^4$ has in particular r amidine or guanidine groups of the formula (Ia) or (Ib).

A catalyst according to the invention having a polysiloxane radical $A^4$ has advantageous properties. It can easily be prepared from commercially available starting materials, has a surprisingly low viscosity and a high catalytic activity and an excellent compatibility in curable compositions, in particular those based on silicone polymers.

The catalyst according to the invention contains at least one amidine or guanidine of the formula (Ia) or (Ib) which is bonded to a silicon atom of a siloxane radical.

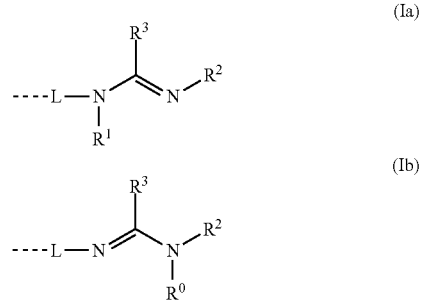

Preferably, L represents a linear or branched, divalent hydrocarbon radical having 1 to 6 C atoms, which optionally contains a nitrogen atom.

Particularly preferably, L represents a radical selected from methylene, 1,3-propylene, 2-methyl-1,3-propylene, 1,4-butylene, 2,2-dimethyl-2,4-butylene and 3-aza-1,6-hexylene. These radicals are numbered starting from the nitrogen atom to which the radical L is bonded.

Of these, 1,3-propylene and 3-aza-1,6-hexylene are preferred.

$R^1$ and $R^0$ preferably independently of each other each represent a hydrogen radical or an alkyl radical having 1 to 4 C atoms, in particular a hydrogen radical.

$R^2$ preferably represents a hydrogen radical or an alkyl, cycloalkyl or aralkyl radical having 1 to 12 C atoms, in particular 1 to 8 C atoms, which optionally contains hetero atoms.

$R^3$ preferably represents —$NHR^5$ or a hydrogen radical or an alkyl, cycloalkyl or aralkyl radical having 1 to 8 C atoms. Particularly preferably, $R^3$ represents —$NHR^5$.

$R^5$ preferably represents a hydrogen radical or an alkyl, cycloalkyl or aralkyl radical having 1 to 12 C atoms, which optionally contains an oxygen atom or a nitrogen atom.

Furthermore preferably, $R^1$ and $R^2$ together represent an alkylene radical having 2 to 4 C atoms, in particular 2 or 3 C atoms.

Furthermore preferably, $R^2$ and $R^0$ together represent an alkylene radical having 4 to 6 C atoms, which optionally contains hetero atoms.

Furthermore preferably, $R^2$ and $R^3$ together represent an alkylene radical having 3 to 5 C atoms.

Furthermore preferably, $R^2$ and $R^5$ together represent an alkylene radical having 2 to 4 C atoms.

In one embodiment of the invention $R^3$ in the catalyst represents a hydrogen radical or an alkyl, cycloalkyl or aralkyl radical having 1 to 12, preferably 1 to 8, in particular 1 to 4, C atoms, or $R^2$ and $R^3$ together represent an alkylene radical having 3 to 6, in particular 3 to 5, C atoms. These catalysts contain amidine groups of the formula (Ia) or (Ib).

Such a catalyst containing amidine groups has the advantage over a corresponding catalyst having guanidine groups that it has a not quite so high catalytic activity and therefore can be employed in a somewhat higher amount, as a result of which it is less susceptible to interferences by other constituents in the composition, in particular the impurities contained therein.

In a catalyst containing amidine groups $R^3$ preferably represents a hydrogen radical or methyl, in particular methyl.

In a catalyst containing amidine groups $R^1$ preferably represents a hydrogen radical or together with $R^2$ 1,2-ethylene or 1,3-propylene.

In a catalyst containing amidine groups $R^2$ preferably represents hexyl, cyclohexyl, benzyl, 2-ethylhexyl, octyl, decyl, dodecyl or 2-methoxyethyl, or together with $R^1$ 1,2-ethylene or 1,3-propylene.

In a catalyst containing amidine groups $R^1$ and $R^2$ in particular together represent 1,2-ethylene.

In a catalyst containing amidine groups L in particular represents 1,3-propylene.

The preferred embodiments of the catalysts containing amidine groups are distinguished by a good catalytic activity and an excellent compatibility in curable compositions.

Combinations with the individual above preferred radicals are particularly preferred.

In a preferred embodiment of the invention $R^3$ in the catalyst represents —$NHR^5$. These catalysts contain guanidine groups. They are distinguished by a still higher catalytic activity compared with the catalysts containing amidine groups and an excellent compatibility in curable compositions.

Catalysts according to the invention having guanidine are preferred over those having amidine groups.

In a catalyst containing guanidine groups $R^2$ and $R^5$ preferably independently of each other each represent an alkyl, cycloalkyl or aralkyl radical having 1 to 18 C atoms, which optionally contains hetero atoms, and $R^1$ preferably represents a hydrogen radical.

The preferred embodiments of the catalysts containing guanidine groups contain guanidine groups of the formula (V), wherein L, $R^2$ and $R^5$ have the meanings already mentioned.

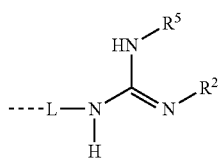
(V)

Catalysts according to the invention having guanidine groups of the formula (V) can be prepared particularly readily and have a quite particularly high catalytic activity.

$R^2$ and $R^5$ in the formula (V) particularly preferably independently of each other each represent ethyl, isopropyl, tert-butyl, 3-(dimethylamino)propyl or cyclohexyl, in particular each represent isopropyl or cyclohexyl, most preferably each represent cyclohexyl. These catalysts are particularly readily accessible.

Particularly preferred catalysts contain at least one guanidine group of the formula (V) which is bonded to a silicon atom of a siloxane radical selected from the polysiloxane radical $A^1$, the polysiloxane radical $A^2$, the polysiloxane radical $A^3$ and the polysiloxane radical $A^4$, as described above.

Of these, the polysiloxane radical $A^1$ is preferred. These catalysts have a particularly high concentration of guanidine groups of the formula (V) and are therefore very catalytically active in a comparatively small amount.

Of these, the polysiloxane radical $A^3$ is furthermore preferred. These catalysts have a particularly low viscosity and are particularly readily compatible in curable compositions based on silicone polymers.

Of these, the polysiloxane radical $A^4$ is furthermore preferred. These catalysts have a relatively high concentration of guanidine groups of the formula (V) at a low viscosity and are particularly readily compatible in curable compositions based on silicone polymers.

A preferred catalyst has the formula (VI)

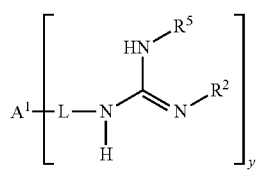
(VI)

wherein $A^1$ represents a polysiloxane radical which contains at least one structural unit of the formula

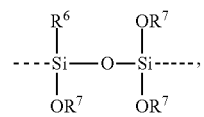

wherein L is bonded directly to the dialkoxy-substituted silicon atom of this structural unit, wherein the polysiloxane radical optionally contains one or more aminoalkyl groups bonded to a silicon atom via a C atom, y represents an integer from 1 to 20, in particular 1 to 10, and L, $R^2$, $R^5$, $R^6$ and $R^7$ have the meanings mentioned.

A further preferred catalyst has the formula (VII)

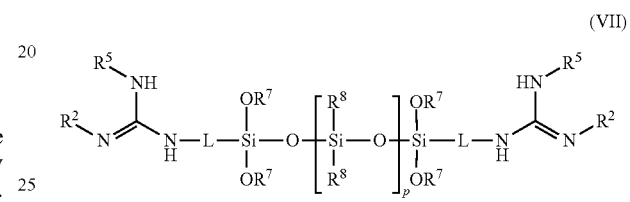
(VII)

wherein $R^2$, $R^5$, $R^7$, $R^8$, L and p have the meanings mentioned.

A catalyst of the formula (VII) can additionally contain contents of the following formula

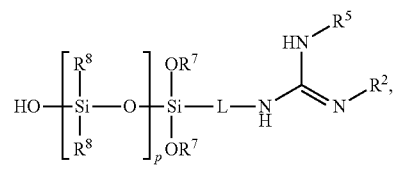

wherein $R^2$, $R^5$, $R^7$, $R^8$, L and p have the meanings mentioned.

A further preferred catalyst has the formula (VIII) or the formula (IX)

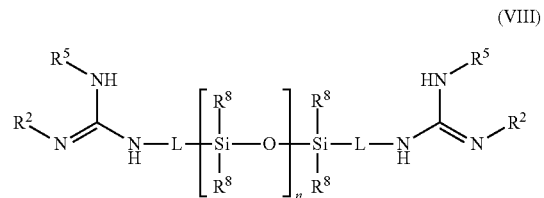
(VIII)

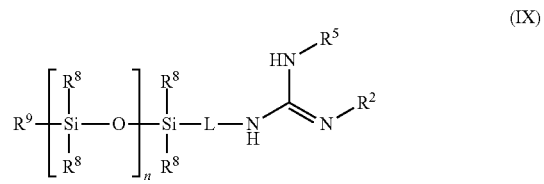
(IX)

wherein $R^2$, $R^5$, $R^8$, $R^9$, L and n have the meanings mentioned.

A further preferred catalyst has the formula (X)

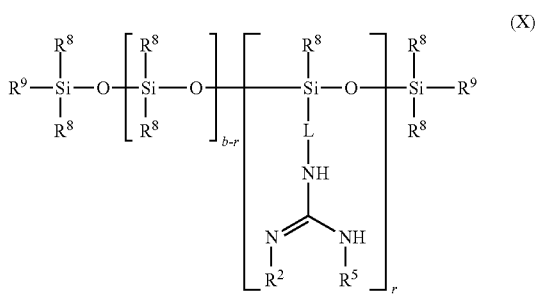

wherein b, r, $R^2$, $R^5$, $R^8$, $R^9$ and L have the meanings mentioned, and wherein the structural units having the index (b-r) and the structural units having the index r can be arranged block-wise, in alternation or randomly in the siloxane chain.

The catalysts of the formula (VI), (VIII) and (X) are particularly preferred.

A catalyst according to the invention is obtained in particular by the reaction of at least one siloxane-amine with at least one reagent for introducing an amidine or guanidine group selected from the group consisting of ortho esters, 1,3-keto esters, 1,3-keto amides, nitriles, imido acid esters, imido acid chlorides, amides, lactams, cyanamide, carbodiimides, ureas, O-alkylisoureas, thioureas, S-alkylisothioureas, aminoiminomethanesulfonic acids, guanylpyrazoles and guanidines.

Ortho esters, 1,2-keto esters, 1,3-keto amides, nitriles, imido acid esters, imido acid chlorides, amides and lactams are suitable for introducing amidine groups, in particular ortho esters, 1,3-keto esters and nitriles.

In a preferred process for the preparation of a catalyst according to the invention in which $R^3$ represents a hydrogen radical or an alkyl, cycloalkyl or aralkyl radical having 1 to 12 C atoms, at least one siloxane-amine is reacted with at least one ortho ester or at least one 1,3-keto ester or at least one nitrile. A catalyst containing amidine groups is formed in this process.

Preferred ortho esters are orthoformates, orthoacetates, orthopropionates, orthobutyrates or orthovalerates, in particular trimethyl orthoformate, triethyl orthoformate, trimethyl orthoacetate or triethyl orthoacetate.

Preferred 1,3-keto esters are methyl acetoacetate, ethyl acetoacetate, isopropyl acetoacetate or tert-butyl acetoacetate, in particular ethyl acetoacetate.

Preferred nitriles are acetonitrile, propionitrile, butyronitrile, isobutyronitrile, valeronitrile or capronitrile, in particular acetonitrile.

Preferably, a catalyst containing amidine groups is obtained by the reaction of at least one siloxane-amine with at least one ortho ester of the formula $R^3$—$C(OR^a)_3$ and optionally at least one monoamine of the formula $R^2$—NH—$R^{10}$, in particular $R^2$—$NH_2$, alcohol $R^aOH$ being liberated, wherein $R^3$ in particular represents a hydrogen radical or a methyl radical and $R^a$ represents an alkyl radical having 1 to 4 C atoms. This reaction is preferably carried out at elevated temperature, in particular at 40 to 160° C. and particularly preferably at 60 to 140° C., under elevated pressure in the presence of a catalyst. Furthermore preferably, a catalyst containing amidine groups is obtained by the reaction of at least one siloxane-amine and optionally at least one monoamine of the formula $R^2$—NH—$R^0$, in particular $R^2$—$NH_2$, with at least one 1,3-keto ester of the formula $R^3$—$C(O)CH_2C(O)OR^a$, wherein $R^3$ in particular represents a methyl radical and $R^a$ represents an alkyl radical having 1 to 4 C atoms. This reaction is preferably carried out at a temperature of from 20 to 100° C., in particular 40 to 80° C., wherein the ester $CH_3C(O)OR^a$ liberated is preferably removed by distillation. Preferably, a catalyst is employed here, in particular an acid, preferably a sulfonic acid.

Monoamines which are preferred for this are n-hexylamine, cyclohexylamine, benzylamine, 2-ethylhexylamine, n-octylamine, n-decylamine, laurylamine or 2-methoxyethylamine.

The reaction can be carried out in one step or several steps.

The reaction product from this process is preferably used as a catalyst without working up and/or purification, with the exception of removal of volatile compounds by distillation, if appropriate in vacuo.

If siloxanediamines are employed, for example, mixtures which comprise oligomeric by-products having several amidine groups in addition to the desired catalyst are typically formed. The reaction is then preferably carried out by employing at least 2 mol of siloxanediamine per 1 mol of ortho ester or 1,3-keto ester, in order to keep the formation of by-products low. The catalysts obtained in this process contain aminoalkyl groups.

If monoamines are additionally employed in addition to, for example, siloxanediamines, less oligomeric by-products are likewise obtained. In this case the reaction is preferably carried out by employing at least 2 mol of ortho ester or 1,3-keto ester and at least 2 mol of monoamine per 1 mol of siloxanediamine.

If siloxane-amines which contain aminoalkyl groups having a primary and a secondary amino group which are separated from one another by a 1,2-ethylene or 1,3-propylene group are employed, the reaction is preferably carried out such that approximately 1 mol of ortho ester or 1,3-keto ester is employed for each such aminoalkylamino group. A catalyst containing at least one amidine group in which $R^1$ and $R^2$ together represent 1,2-ethylene or 1,3-propylene is obtained in this process.

In the following formula a structural unit containing amidine groups is shown by way of example in the form of a reaction product of orthoacetate and a structural unit containing an N-(2-aminoethyl)-3-aminoprop-1-yl group.

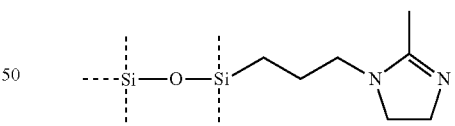

Cyanamides, carbodiimides, ureas, O-alkylisoureas, thioureas, S-alkylisothioureas, aminoiminomethanesulfonic acids, guanylpyrazoles or guanidines are suitable for introducing guanidine groups. Cyanamides or carbodiimides are preferred.

Carbodiimides are particularly preferred. Particularly active catalysts are obtainable in a particularly simple manner by this route.

In a particularly preferred process a catalyst in which $R^3$ represents —$NHR^5$ is obtained by the reaction of at least one siloxane-amine with at least one carbodiimide of the formula $R^5$—N=C=N—$R^2$, wherein $R^2$ and $R^5$ have the meanings already described A catalyst containing guanidine groups is formed in this process.

The reaction of the siloxane-amine with the carbodiimide is preferably carried out at elevated temperature, in particular at 40 to 160° C. and particularly preferably at 60 to 140° C. The reaction can be carried out completely without the use of VOC solvents. To accelerate the reaction a catalyst can be employed, in particular an acid, such as e.g. a carboxylic acid or carbonic acid, or a Lewis acid, such as e.g. boron trifluoride etherate, aluminum chloride, aluminum acetylacetonate, iron(III) chloride, lithium perchlorate, zinc chloride, zinc acetate, zinc neodecanoate, zinc acetylacetonate, zinc triflate or lanthanum triflate.

The reaction can be carried out in one step or several steps.

In the reaction, carbodiimide is preferably employed in an amount such that at most one mol of carbodiimide is present per equivalent of guanidine group which is to be formed.

In particular, the carbodiimide is employed in the stoichiometric amount with respect to the primary amino groups of the siloxane-amine. In this manner the catalyst obtained is largely free from primary amino groups.

The reaction product from this process is preferably used without working up and/or purification.

Suitable carbodiim ides are typically aliphatic, cycloaliphatic or arylaliphatic carbodiimides, in particular simple, commercially obtainable aliphatic and cycloaliphatic carbodiimides, preferably N,N'-diisopropylcarbodiimide (DIC), N,N'-di-tert-butylcarbodiimide, N,N'-dicyclohexylcarbodiimide (DCC) or N-ethyl-N'-(3-dimethylaminopropyl)carbodiimide (EDC), particularly preferably N,N'-diisopropylcarbodiimide (DIC) or N,N'-dicyclohexylcarbodiimide (DCC), in particular DCC.

Siloxane-amines which are suitable for the preparation of the catalysts described contain at least one amino group of the formula -L-NHR$^1$ which is bonded to a silicon atom of a siloxane radical. L and R$^1$ here have the meanings mentioned.

The siloxane-amine is preferably a polysiloxane-amine.

In one embodiment a polysiloxane-amine which contains a polysiloxane radical A$^1$, as described above, but wherein instead of the amidine or guanidine group one at least primary or secondary amino group, in particular at least one primary amino group, is bonded directly to the dialkoxy-substituted silicon atom via a hydrocarbon radical L is preferred.

These polysiloxane-amines are typically condensation products from the co-condensation of trialkoxyaminosilanes with amine-free trialkoxyorganosilanes. Suitable trialkoxyaminosilanes are in particular 3-aminopropyltrimethoxysilane, N-(2-aminoethyl)-3-aminopropyltrimethoxysilane, 3-amino-2-methylpropyltrimethoxysilane, 4-aminobutyltrimethoxysilane or 4-amino-3,3-dimethylbutyltrimethoxysilane, or analogues thereof with ethoxy instead of the methoxy groups on the silicon, in particular 3-aminopropyltrimethoxysilane, 3-aminopropyltriethoxysilane, N-(2-aminoethyl)-3-aminopropyltrimethoxysilane or N-(2-aminoethyl)-3-aminopropyltriethoxysilane.

Suitable amine-free trialkoxyorganosilanes here are in particular trimethoxymethylsilane, triethoxymethylsilane, trimethoxyvinylsilane or triethoxyvinylsilane.

A polysiloxane-amine from the co-condensation of N-(2-aminoethyl)-3-aminopropyltrimethoxysilane with trimethoxyvinylsilane is particularly preferred.

In a further embodiment a polysiloxane-amine of the formula (XI) is preferred

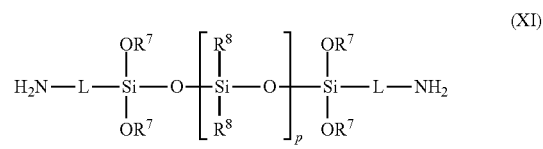

wherein p, L, R$^7$ and R$^8$ have the meanings already mentioned.

These polysiloxane-amines are typically condensation products of trialkoxyaminosilanes with hydroxy-terminated silicone oils.

Suitable trialkoxyaminosilanes here are those already mentioned, in particular 3-aminopropyltrimethoxysilane, 3-aminopropyltriethoxysilane, N-(2-aminoethyl)-3-aminopropyltrimethoxysilane or N-(2-aminoethyl)-3-aminopropyltriethoxysilane.

Suitable hydroxy-terminated silicone oils are, in particular, hydroxy-terminated polydimethylsiloxanes, polymethylphenylsiloxanes or polydiphenylsiloxanes. Hydroxy-terminated polydimethylsiloxanes from the hydrolysis of hexamethyltrisiloxane and/or octamethyltetrasiloxane are particularly suitable. A particularly preferred polysiloxane-amine of the formula (XI) corresponds to the following formula

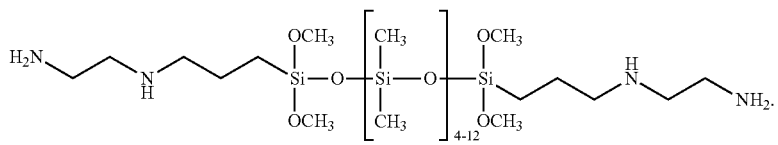

In a further embodiment a polysiloxane-amine of the formula (XII) or (XIII) is preferred

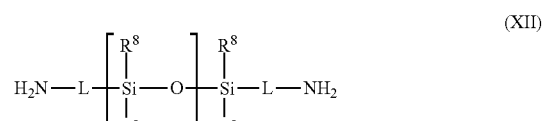

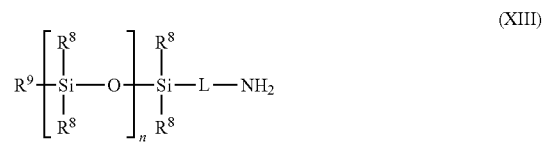

wherein n, L, R$^8$ and R$^9$ have the meanings already mentioned.

These polysiloxane-amines are in particular aminoalkyl-terminated silicone oils.

In a further embodiment a polysiloxane-amine of the formula (XIV) is preferred

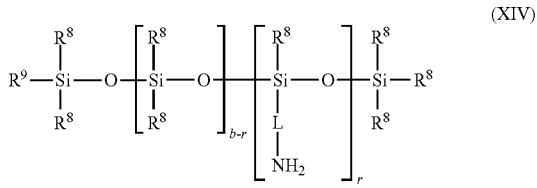

(XIV)

wherein b, r, L, $R^8$ and $R^9$ have the meanings already mentioned.

These polysiloxane-amines are in particular silicone oils having aminoalkyl groups in the side chains.

Suitable polysiloxane-amines are commercially obtainable, for example as Dynasylan® 1146 (from Evonik), Silquest® Y15744 (from Momentive), X-40-2651 (from Shin-Etsu), Z-6184 Silane (from Dow Corning), Silaplane® FM-3311, Silaplane® FM-3322, Silaplane® FM-3325 (all from Chisso), Wacker® Aminöl SLM 92502, Wacker® Aminöl SLM 92503, Wacker® Aminöl SLM 92507, Wacker® Aminöl SLM 446011-20 VP, Wacker® Aminöl SLM 446011-50 VP, Wacker® L 653, Wacker® L 655, Wacker® L 656, Wacker® FINISH WR 1100, Wacker® FINISH WT 1650 (all from Wacker) or as Reactive Silicone Fluids KF-393, KF-857, KF-858, KF-859, KF-860, KF-861, KF-862, KF-864, KF-865, KF-867, KF-868, KF-869, KF-880, KF-8001, KF-8002, KF-8004, KF-8005, X-22-3820W, KF-8008, KF-8010, KF-8012, X-22-161A, X-22-161B, X-22-1660B-3, X-22-9192 (all from Shin Etsu).

Aminopropylated polysiloxane-amines such as are obtainable by reaction of commercially available polysiloxane-amines with acrylonitrile and subsequent hydrogenation are likewise suitable.

The siloxane-amine for the preparation of a catalyst according to the invention is preferably selected from the group consisting of
- a co-condensation product of at least one trialkoxyaminosilane with at least one amine-free trialkoxyorganosilane,
- a polysiloxane-amine of the formula (XI),
- a polysiloxane-amine of the formula (XII),
- a polysiloxane-amine of the formula (XIII) and
- a polysiloxane-amine of the formula (XIV).

In a preferred embodiment of this process for the preparation of a catalyst according to the invention, this is prepared in situ in the presence of a polymer containing silane groups. For this, the siloxane-amine and the reagent for introducing an amidine or guanidine group is mixed with a polymer containing silane groups and the mixture is reacted at a temperature in the range of from 40 to 120° C. Such an in situ reaction can also be carried out in particular in the presence of further constituents such as are typical of compositions based on polymers containing silane groups.

In an in situ preparation of the catalyst, this is first formed with a certain time delay, which in practice can be an advantage.

The in situ process for the preparation of a catalyst containing guanidine groups from the reaction of a siloxane-amine with a carbodiimides is particularly preferred.

The catalyst according to the invention can be employed in particular for accelerating the crosslinking of curable compositions. Examples of suitable curable compositions are epoxy resin compositions, in particular heat-curing systems which crosslink via dicyandiamide or carboxylic acids or carboxylic acid anhydrides, such as are employed, for example, in adhesives, coatings and casting resins; polyurethane compositions, in particular two-component systems which crosslink by reaction of polyols with isocyanates, such as are employed, for example, for adhesives, coverings, embedding compositions, sealing joints, shaped bodies or block foam, and one-component systems having blocked isocyanate groups or blocked amino groups, such as are employed, for example, in powder coatings, coil coatings, electrodip coatings and liquid paints; epoxy resin-polyurethane hybrid systems; cyanate ester resin compositions; and compositions containing silane groups.

The use in compositions containing silane groups is particularly advantageous, wherein these also cure rapidly at a relatively low concentration of the catalyst according to the invention and do not tend towards migration-related defects, such as separation, exudation or substrate contamination.

The invention accordingly also relates to the use of a catalyst according to the invention in a curable composition, in particular a composition containing silane groups, as a crosslinking catalyst. The curable composition here is, in particular, an adhesive, a sealant or a coating.

The invention also relates to a curable composition comprising at least one catalyst according to the invention as described above.

Such a composition additionally comprises in particular at least one epoxy resin or at least one polyisocyanate or at least one blocked isocyanate or at least one cyanate ester resin or at least one polymer containing silane groups.

Preferably, the curable composition comprises at least one polymer containing silane groups, in addition to the catalyst according to the invention.

Preferably, the polymer containing silane groups is selected from the group consisting of polysiloxanes having terminal silane groups and organic polymers containing silane groups.

A polyorganosiloxane having terminal silane groups has the advantage that in the cured state it is particularly resistant to water and light and renders possible particularly soft elastic properties.

An organic polymer containing silane groups has the advantage that it has particularly good adhesion properties on a large number of substrates and is particularly inexpensive.

In a preferred embodiment the polymer containing silane groups is a polysiloxane having terminal silane groups, called "reactive silicone polymer" in the following, which preferably has the formula (XV)

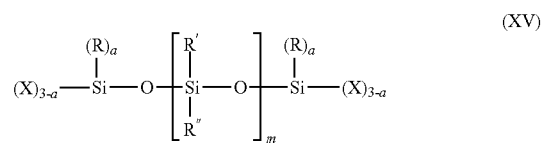

(XV)

wherein

R, R' and R" independently of each other each represent a monovalent hydrocarbon radical having 1 to 12 C atoms;

X represents a hydroxyl radical or an alkoxy, acetoxy, ketoximato, amido or enoxy radical having 1 to 13 C atoms;

a represents 0, 1 or 2; and m represents an integer in the range of from 50 to about 2,500.

R preferably represents methyl, vinyl or phenyl.

R' and R" preferably independently of each other each represent an alkyl radical having 1 to 5, preferably 1 to 3 C atoms, in particular methyl.

X preferably represents a hydroxyl radical or an alkoxy or ketoximato radical having 1 to 6 C atoms, in particular a hydroxyl, methoxy, ethoxy, methylethylketoximato or methylisobutylketoximato radical.

Particularly preferably, X represents a hydroxyl radical.

a preferably represents 0 or 1, in particular 0.

Furthermore, m is preferably selected such that the reactive silicone polymer of the formula (XV) has a viscosity at room temperature in the range of from 100 to 500,000 mPa·s, in particular from 1,000 to 100,000 mPa·s.

Such reactive silicone polymers are easy to handle and crosslink with moisture and/or silane crosslinking agents to give solid silicone polymers having elastic properties.

Suitable commercially obtainable reactive silicone polymers are obtainable, for example, from Wacker, Momentive Performance Material, GE Advanced Materials, Dow Corning, Bayer or Shin Etsu.

Preferably, the curable composition comprises, in addition to a reactive silicone polymer, a silane crosslinking agent, in particular a silane of the formula (XVI)

(XVI)

wherein

R''' represents a monovalent hydrocarbon radical having 1 to 12 C atoms,

X' represents a hydroxyl radical or an alkoxy, acetoxy, ketoximato, amido or enoxy radical having 1 to 13 C atoms; and t represents a value of 0, 1 or 2, in particular 0 or 1.

Particularly suitable silanes of the formula (XVI) are methyltrimethoxysilane, ethyltrimethoxysilane, propyltrimethoxysilane, vinyltrimethoxysilane, methyltriethoxysilane, vinyltriethoxysilane, phenyltriethoxysilane, tetramethoxysilane, tetraethoxysilane, methyltris(methylethylketoximo)silane, vinyltris(methylethylketoximo)silane and methyltris(isobutylketoximo)silane.

In a further preferred embodiment of the invention the polymer containing silane groups is an organic polymer containing silane groups, in particular a polyolefin, polyester, polyamide, poly(meth)acrylate or polyether or a mixed form of these polymers, which in each case carries one or preferably several silane groups. The silane groups can be lateral in the chain or terminal. Particularly preferably, the organic polymer containing silane groups is a polyolefin containing silane groups or a polyester containing silane groups or a poly(meth)acrylate containing silane groups or a polyether containing silane groups or a mixed form of these polymers. A polyether containing silane groups is most preferred.

Preferred silane groups on the organic polymer are alkoxysilane groups, in particular end groups of the formula (XVII)

(XVII)

wherein $R^{10}$ represents a linear or branched, monovalent hydrocarbon radical having 1 to 5 C atoms, in particular methyl or ethyl or isopropyl;

$R^{11}$ represents a linear or branched, monovalent hydrocarbon radical having 1 to 8 C atoms, in particular methyl or ethyl; and x represents 0 or 1 or 2, preferably 0 or 1, in particular 0.

Particularly preferably, $R^{10}$ represents methyl or ethyl.

Trimethoxysilane groups, dimethoxymethylsilane groups or triethoxysilane groups are particularly preferred.

In this context methoxysilane groups have the advantage that they are particularly reactive, and ethoxysilane groups have the advantage that they are toxicologically advantageous and particularly storage-stable.

The organic polymer containing silane groups has on average preferably 1.3 to 4, in particular 1.5 to 3, particularly preferably 1.7 to 2.8 silane groups per molecule. The silane groups are preferably terminal.

The organic polymer containing silane groups preferably has an average molecular weight, determined by means of GPC against a polystyrene standard, in the range of from 1,000 to 30,000 g/mol, in particular from 2,000 to 20,000 g/mol. The organic polymer containing silane groups preferably has a silane equivalent weight of from 300 to 25,000 g/eq, in particular from 500 to 15,000 g/eq.

The organic polymer containing silane groups can be present in the solid or liquid form at room temperature. Preferably, it is liquid at room temperature. The organic polymer containing silane groups is most preferably a polyether containing silane groups which is liquid at room temperature, wherein the silane groups are in particular dialkoxysilane groups and/or trialkoxysilane groups, particularly preferably trimethoxysilane groups or triethoxysilane groups.

Processes for the preparation of polyethers containing silane groups are known to the person skilled in the art.

In one process polyethers containing silane groups are obtainable from the reaction of polyethers containing allyl groups with hydrosilanes, where appropriate with chain lengthening with, for example, diisocyanates.

In a further process polyethers containing silane groups are obtainable from the copolymerization of alkylene oxides and epoxysilanes, where appropriate with chain lengthening with, for example, diisocyanates.

In a further process polyethers containing silane groups are obtainable from the reaction of polyether polyols with isocyanatosilanes, where appropriate with chain lengthening with diisocyanates.

In a further process polyethers containing silane groups are obtainable from the reaction of polyethers containing isocyanate groups, in particular NCO-terminated urethane polyethers from the reaction of polyether polyols with a stoichiometric excess of polyisocyanates, with aminosilanes, hydroxysilanes or mercaptosilanes. Polyethers containing silane groups from this process are particularly preferred. This process renders possible the use of a large number of commercially readily available, inexpensive starting materials, whereby various polymer properties can be obtained, for example a high extensibility, a high strength, a low elasticity modulus, a low glass transition point or a high resistance to weathering.

Particularly preferably, the polyether containing silane groups is obtainable from the reaction of NCO-terminated urethane polyethers with aminosilanes or hydroxysilanes. Suitable NCO-terminated urethane polyethers are obtainable from the reaction of polyether polyols, in particular polyoxyalkylene diols or polyoxyalkylene triols, preferably polyoxypropylene diols or polyoxypropylene triols, with a stoichiometric excess of polyisocyanates, in particular diisocyanates.

Preferably, the reaction between the polyisocyanate and the polyether polyol is carried out with exclusion of moisture at a temperature of from 50° C. to 160° C., where appropriate in the presence of suitable catalysts, wherein the polyisocyanate is metered into the reaction mixture such that the isocyanate groups thereof are present in a stoichiometric excess in relation to the hydroxyl groups of the polyol. In particular, the excess of polyisocyanate is chosen such that a content of free isocyanate groups of from 0.1 to 5% by weight, preferably 0.2 to 4% by weight, particularly preferably 0.3 to 3% by weight, based on the total polymer, remains in the resulting urethane polyether after the reaction of all the hydroxyl groups.

Preferred diisocyanates are selected from the group consisting of 1,6-hexamethylene diisocyanate (HDI), 1-isocyanato-3,3,5-trimethyl-5-isocyanatomethylcyclohexane (=isophorone diisocyanate or IPDI), 2,4- and 2,6-toluylene diisocyanate and any desired mixtures of these isomers (TDI) and 4,4'-, 2,4'- and 2,2'-diphenylmethane diisocyanate and any desired mixtures of these isomers (MDI). IPDI or TDI are particularly preferred. IPDI is most preferred. Polyethers containing silane groups having a particularly good fastness to light are obtained with these.

Polyoxyalkylene diols or polyoxyalkylene triols having a degree of unsaturation of lower than 0.02 meq/g, in particular lower then 0.01 meq/g, and an average molecular weight in the range of from 400 to 25,000 g/mol, in particular 1,000 to 20,000 g/mol, are specifically suitable as polyether polyols.

In addition to polyether polyols, a proportion of other polyols can also be employed, in particular polyacrylate polyols, as well as low molecular weight diols or triols.

Suitable aminosilanes for the reaction with an NCO-terminated urethane polyether are primary and secondary aminosilanes. 3-Aminopropyltrimethoxysilane, 3-aminopropyldimethoxymethylsilane, 4-aminobutyltrimethoxysilane, 4-amino-3-methylbutyltrimethoxysilane, 4-amino-3,3-dimethylbutyltrimethoxysilane, N-butyl-3-aminopropyltrimethoxysilane, N-phenyl-3-aminopropyltrimethoxysilane, adducts from primary aminosilanes, such as 3-aminopropyltrimethoxysilane, 3-aminopropyldimethoxymethylsilane or N-(2-aminoethyl)-3-aminopropyltrimethoxysilane, and Michael acceptors, such as acrylonitrile, (meth)acrylic acid esters, (meth)acrylic acid amides, maleic acid diesters or fumaric acid diesters, citraconic acid diesters or itaconic acid diesters, in particular N-(3-trimethoxysilylpropyl)aminosuccinic acid dimethyl or diethyl ester, are preferred. Analogues of the aminosilanes mentioned with ethoxy or isopropoxy groups instead of the methoxy groups on the silicon are likewise suitable.

Suitable hydroxysilanes for the reaction with an NCO-terminated urethane polyether are obtainable in particular from the addition of aminosilanes on to lactones or on to cyclic carbonates or on to lactides.

Aminosilanes which are suitable for this are, in particular 3-aminopropyltrimethoxysilane, 3-aminopropyltriethoxysilane, 4-aminobutyltrimethoxysilane, 4-aminobutyltriethoxysilane, 4-amino-3-methylbutyltrimethoxysilane, 4-amino-3-methylbutyltriethoxysilane, 4-amino-3,3-dimethylbutyltrimethoxysilane, 4-amino-3,3-dimethylbutyltriethoxysilane, 2-aminoethyltrimethoxysilane or 2-aminoethyltriethoxysilane. 3-Aminopropyltrimethoxysilane, 3-aminopropyltriethoxysilane, 4-amino-3,3-dimethylbutyltrimethoxysilane or 4-amino-3,3-dimethylbutyltriethoxysilane are particularly preferred.

Suitable lactones are in particular γ-valerolactone, γ-octalactone, δ-decalactone and ε-decalactone, in particular γ-valerolactone.

Suitable cyclic carbonates are in particular 4,5-dimethyl-1,3-dioxolan-2-one, 4,4-dimethyl-1,3-dioxolan-2-one, 4-ethyl-1,3-dioxolan-2-one, 4-methyl-1,3-dioxolan-2-one or 4-(phenoxymethyl)-1,3-dioxolan-2-one.

Suitable lactides are in particular 1,4-dioxane-2,5-dione (lactide from 2-hydroxyacetic acid, also called "glycolide"), 3,6-dimethyl-1,4-dioxane-2,5-dione (lactide from lactic acid, also called "lactide") and 3,6-diphenyl-1,4-dioxane-2,5-dione (lactide from mandelic acid).

Preferred hydroxysilanes which are obtained in this manner are N-(3-triethoxysilylpropyl)-2-hydroxypropanamide, N-(3-trimethoxysilylpropyl)-2-hydroxypropanamide, N-(3-triethoxysilylpropyl)-4-hydroxypentanamide, N-(3-triethoxysilylpropyl)-4-hydroxyoctanamide, N-(3-triethoxysilylpropyl)-5-hydroxydecanamide or N-(3-triethoxysilylpropyl)-2-hydroxypropylcarbamate. Suitable hydroxysilanes are furthermore also obtainable from the addition of aminosilanes on to epoxides or from the addition of amines on to epoxysilanes. Preferred hydroxysilanes which are obtained in this manner are 2-morpholino-4(5)-(2-trimethoxysilylethyl)cyclohexan-1-ol, 2-morpholino-4(5)-(2-triethoxysilylethyl)cyclohexan-1-ol or 1-morpholino-3-(3-(triethoxysilyl)-propoxy)propan-2-ol.

Commercially obtainable products are also suitable as polyethers containing silane groups, in particular the following: MS Polymer™ (from Kaneka Corp.; in particular the types 5203H, 5303H, S227, S810, MA903 and S943); MS Polymer™ or Silyl™ (from Kaneka Corp.; in particular the types SAT010, SAT030, SAT200, SAX350, SAX400, SAX725, MAX450, MAX951); Excestar® (from Asahi Glass Co. Ltd.; in particular the types S2410, S2420, S3430, S3630); SPUR+* (from Momentive Performance Materials; in particular the types 1010LM, 1015LM, 1050MM); Vorasil™ (from Dow Chemical Co.; in particular the types 602 and 604); Desmoseal® (from Bayer MaterialScience AG; in particular the types S XP 2458, S XP 2636, S XP 2749, S XP 2774 and S XP 2821), TEGOPAC® (from Evonik Industries AG; in particular the types Seal 100, Bond 150, Bond 250), Polymer ST (from Hanse Chemie AG/Evonik Industries AG, in particular the types 47, 48, 61, 61LV, 77, 80, 81); Geniosil® STP (from Wacker Chemie AG; in particular the types E10, E15, E30, E35).

Particularly preferred end groups of the formula (XVII) are end groups of the formula (XVIII)

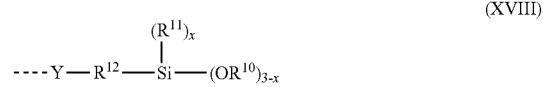

(XVIII)

wherein
$R^{12}$ represents a linear or branched, divalent hydrocarbon radical having 1 to 12 C atoms, which optionally contains cyclic and/or aromatic contents and optionally one or more hetero atoms, in particular one or more nitrogen atoms; Y represents a divalent radical selected from —O—, —S—, —N($R^{13}$)—, —O—CO—N($R^{13}$)—, —N($R^{13}$)—CO—O— and —N($R^{13}$)—CO—N($R^{13}$)—,
  wherein $R^{13}$ represents a hydrogen radical or a linear or
    branched hydrocarbon radical having 1 to 20 C atoms, which optionally contains cyclic contents, and which optionally contains an alkoxysilyl, ether or carboxylic acid ester group; and $R^{10}$, $R^{11}$ and x have the meanings already mentioned.

Preferably, $R^{12}$ represents 1,3-propylene or 1,4-butylene, wherein butyl can be substituted by one or two methyl groups.

Particularly preferably, $R^{12}$ represents 1,3-propylene.

Preferably, the catalyst according to the invention is present in a composition containing silane groups in an amount such that the weight ratio between the polymer containing silane groups and the catalyst is at least 10/1, preferably at least 20/1.

Furthermore preferably, the catalyst according to the invention is present in a composition containing silane groups in an amount such that the weight ratio between the polymer containing silane groups and the catalyst is at most 5,000/1, preferably at most 2,000/1, in particular at most 1,0000/1.

Preferably, the weight ratio between the polymer containing silane groups and the catalyst according to the invention is in the range of from 10/1 to 2,000/1, in particular 10/1 to 1,000/1.

Such a composition has a good storage stability and rapid curing.

In addition to the catalyst according to the invention, the curable composition can comprise further catalysts, in particular for the crosslinking of silane groups. Suitable further catalysts are in particular metal catalysts and/or basic nitrogen or phosphorus compounds.

Possible metal catalysts are in particular compounds of tin, titanium, zirconium, aluminum or zinc, in particular diorganotin(IV) compounds, such as, in particular, dibutyltin(IV) diacetate, dibutyltin(IV) dilaurate, dibutyltin(IV) dineodecanoate or dibutyltin(IV) bis(acetylacetonate) and dioctyltin(IV) dilaurate, as well as titanium(IV) or zirconium (IV) or aluminum(III) or zinc(II) complexes with, in particular, alkoxy, carboxylate, 1,3-diketonate, 1,3-ketoesterate or 1,3-ketoamidate ligands.

Possible basic nitrogen or phosphorus compounds are in particular imidazoles, pyridines, phosphazene bases or, preferably, amines, hexahydrotriazines or biguanides, as well as amidines or guanidines which do not correspond to the catalyst according to the invention.

Suitable amines are in particular alkyl-, cycloalkyl- or aralkylamines, such as triethylamine, triisopropylamine, 1-butylamine, 2-butylamine, tert-butylamine, 3-methyl-1-butylamine, 3-methyl-2-butylamine, dibutylamine, tributylamine, hexylamine, dihexylamine, cyclohexylamine, dicyclohexylamine, dimethylcyclohexylamine, benzylamine, dibenzylamine, dimethylbenzylamine, octylamine, 2-ethylhexylamine, di-(2-ethylhexyl)amine, laurylamine, N,N-dimethyllaurylamine, stearylamine, N,N-dimethylstearylamine; fatty amines derived from natural fatty acid mixtures, such as, in particular, coco-alkylamine, N,N-dimethyl-coco-alkylamine, $C_{16}$-$C_{22}$-alkylamine, N,N-dimethyl-$C_{16}$-$C_{22}$-alkylamine, soya-alkylamine, N,N-dimethyl-soya-alkylamine, oleylamine, N,N-dimethyloleylamine, tallow-alkylamine or N,N-dimethyl-tallow-alkylamine, obtainable, for example, under the trade name Armeen® (from Akzo Nobel) or Rofamin® (from Ecogreen Oleochemicals); aliphatic, cycloaliphatic or araliphatic diamines, such as ethylenediamine, butanediamine, hexamethylenediamine, dodecanediamine, neopentanediamine, 2-methylpentamethylenediamine (MPMD), 2,2(4),4-trimethylhexamethylene-diamine (TMD), isophoronediamine (IPD), 2,5(2,6)-bis-(aminomethyl)-bicyclo[2.2.1]heptane (NBDA), 1,3-xylylenediamine (MXDA), N,N'-di(tert-butyl)ethylenediamine, N, N, N',N'-tetramethylethylenediamine, N, N, N',N'-tetramethylpropylenediamine, N,N,N',N'-tetramethylhexamethylenediamine, 3-dimethylaminopropylamine, 3-(methylamino)propylamine, 3-(cyclohexylamino)propylamine, piperazine, N-methylpiperazine, N,N'-dimethylpiperazine, 1,4-diazabicyclo[2.2.2]octane, fatty polyamines, such as N-coco-alkyl-1,3-propanediamine, N-oleyl-1,3-propanediamine, N-soya-alkyl-1,3-propanediamine, N-tallow-alkyl-1,3-propanediamine or N—($C_{16-22}$-alkyl)-1,3-propanediamine, obtainable, for example, under the trade name Duomeen® (from Akzo Nobel); polyalkylenamines, such as diethylenetriamine, dipropylenetriamine, triethylenetetramine (TETA), tetraethylenepentamine (TEPA), pentamethylenehexamine (PEHA), 3-(2-aminoethyl)-aminopropylamine, N,N'-bis(3-aminopropyl)ethylenediamine, N-(3-aminopropyl)-N-methylpropanediamine, bis(3-dimethylaminopropyl)amine, N-(3-dimethylaminopropyl)-1,3-propylenediamine, N-(2-aminoethyl)piperazine (N-AEP), N-(2-aminopropyl)piperazine, N,N'-di-(2-aminoethyl)piperazine, 1-methyl-4-(2-dimethylaminoethyl)piperazine, N,N,N',N",N"-pentamethyldiethylenetriamine, N,N,N',N",N"-pentamethyldipropylenetriamine, polyethylenimines, obtainable, for example, under the trade name Lupasol® (from BASF) and Epomin® (from Nippon Shokubai); ether-amines, such as, in particular, 2-methoxyethylamine, 2-ethoxyethylamine, 3-methoxypropylamine, 3-ethoxypropylamine, 3-(2-ethylhexyloxy)propylamine, 3-(2-methoxyethoxy)propylamine, 2(4)-methoxyphenylethylamine, morpholine, N-methylmorpholine, N-ethylmorpholine, 2-aminoethylmorpholine, bis(2-aminoethyl) ether, bis(dimethylaminoethyl) ether, bis(dimorpholinoethyl) ether, N,N,N'-trimethyl-N'-hydroxyethylbis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine or 2-aminopropyl-terminated glycols, such as are obtainable, for example, under the trade name Jeffamin® (from Huntsman); amino alcohols, such as, in particular, ethanolamine, isopropanolamine, diethanolamine, diisopropanolamine, triethanolamine, triisopropanolamine, N-butylethanolamine, diglycolamine, N,N-diethylethanolamine, N-methyldiethanolamine, N-methyldiisopropylamine, N,N,N'-trimethylaminoethylethanolamine, N-(3-dimethylaminopropyl)-N, N-diisopropanolamine, N,N-Bis(3-dimethylaminopropyl)-N-isopropanolamine, 2-(2-dimethylaminoethoxy)ethanolamine or adducts from mono- and polyamines with epoxides or diepoxides; amines containing phenol groups, such as, in particular, condensation products from phenols, aldehydes and amines (so-called Mannich bases and phenalkamines), such as, in particular, 2-(dimethylaminomethyl)phenol, 2,4,6-tris(dimethylaminomethyl)phenol or polymers from phenol, formaldehyde and N,N-dimethyl-1,3-propanediamine as well as phenalkamines commercially obtainable under the trade name Cardolite® (from Cardolite), Aradur® (from Huntsman) and Beckopox® (from Cytec); polyamines containing amide groups, so-called polyamidoamines, such as are commercially obtainable, for example under the trade name Versamid® (from Cognis), Aradur® (from Huntsman), Euretek® (from Huntsman) or Beckopox® (from Cytec); or aminosilanes, such as, in particular, 3-aminopropyltrimethoxysilane, 3-aminopropyldimethoxymethylsilane, N-(2-aminoethyl)-3-aminopropyltrimethoxysilane, N-(2-aminoethyl)-3-aminopropylmethyldimethoxysilane, N-(2-aminoethyl)-N'-[3-(trimethoxysilyl)propyl]ethylenediamine or analogues thereof with ethoxy instead of the methoxy groups on the silicon.

Suitable triazines are in particular 1,3,5-hexahydrotriazine or 1,3,5-tris(3-dimethylamino)propyl)hexahydrotriazine.

Suitable biguanides are in particular biguanide, 1-butylbiguanide, 1,1-dimethylbiguanide, 1-butylbiguanide, 1-phenylbiguanide or 1-(o-tolyl)biguanide (OTBG).

Suitable amidines which do not correspond to the catalyst according to the invention are in particular 1,8-diazabicyclo[5.4.0]undec-7-ene (DBU), 1,5-diazabicyclo[4.3.0]non-5-ene (DBN), 6-dibutylamino-1,8-diazabicyclo[5.4.0]-undec-7-ene, 6-dibutylamino-1,8-diazabicyclo[5.4.0]undec-7-ene, N,N'-di-n-hexylacetamidine (DHA), 2-methyl-1,4,5,6-tetrahydropyrimidine, 1,2-dimethyl-1,4,5,6-tetrahydropyrimidine, 2,5,5-trimethyl-1,4,5,6-tetrahydropyrimidine, N-(3-trimethoxysilylpropyl)-4,5-dihydroimidazole or N-(3-triethoxysilylpropyl)-4,5-dihydroimidazole.

Suitable guanidines which do not correspond to the according to the invention according to the invention are in particular 1-butylguanidine, 1,1-dimethylguanidine, 1,3-dimethylguanidine, 1,1,3,3-tetramethylguanidine (TMG), 2-(3-(trimethoxysilyl)propyl)-1,1,3,3-tetramethylguanidine, 2-(3-(methyldimethoxysilyl)propyl)-1,1,3,3-tetramethylguanidine, 2-(3-(triethoxysilyl)propyl)-1,1,3,3-tetramethylguanidine, 1,5,7-triazabicyclo[4.4.0]dec-5-ene (TBD), 7-methyl-1,5,7-triazabicyclo[4.4.0]dec-5-ene, 7-cyclohexyl-1,5,7-triazabicyclo[4.4.0]dec-5-ene, 1-phenylguanidine, 1-(o-tolyl)guanidine (OTG), 1,3-diphenylguanidine, 1,3-di(o-tolyl)guanidine or 2-guanidinobenzimidazole.

The curable composition can furthermore comprise an acid, in particular a carboxylic acid, as a co-catalyst. Aliphatic carboxylic acids, such as formic acid, lauric acid, stearic acid, isostearic acid, oleic acid, 2-ethyl-2,5-dimethylcaproic acid, 2-ethylhexanoic acid, neodecanoic acid, fatty acid mixtures from the saponification of natural fats and oils or di- and polycarboxylic acids, in particular poly(meth)acrylic acids, are preferred.

In a preferred embodiment the curable composition is substantially free from organotin compounds. Organotin-free compositions are advantageous with respect to protection of health and protection of the environment. In particular, the tin content of the curable composition is less than 0.1 wt. %, in particular less than 0.05 wt. %.

In one embodiment of the invention the curable composition additionally comprises at least one organotitanate in addition to the catalyst according to the invention. A combination of catalyst according to the invention and organotitanate has a particularly high catalytic activity. By this means a rapid curing of such a composition employing a relatively small amount of the catalyst is rendered possible.

Suitable organotitanates are in particular titanium(IV) complex compounds. Preferred organotitanates are selected in particular from titanium(IV) complex compounds with two 1,3-diketonate ligands, in particular 2,4-pentanedionate (=acetylacetonate), and two alcoholate ligands;
titanium(IV) complex compounds with two 1,3-ketoesterate ligands, in particular ethyl acetoacetate, and two alcoholate ligands;
titanium(IV) complex compounds with one or more aminoalcoholate ligands, in particular triethanolamine or 2-((2-aminoethyl)amino)ethanol, and one or more alcoholate ligands;
titanium(IV) complex compounds with four alcoholate ligands;
and more highly condensed organotitanates, in particular oligomeric titanium(IV) tetrabutanolate, also called polybutyl titanate;

wherein suitable alcoholate ligands are in particular isobutoxy, n-butoxy, isopropoxy, ethoxy and 2-ethylhexoxy.

Very particularly suitable organotitanates are selected from bis(ethylacetoacetato)diisobutoxy-titanium(IV) (commercially obtainable, for example, as Tyzor® IBAY from Dorf Ketal), bis(ethylacetoacetato)diisopropoxy-titanium(IV) (commercially obtainable, for example, as Tyzor® DC from Dorf Ketal), bis(acetylacetonato)diisopropoxy-titanium(IV), bis(acetylacetonato)diisobutoxy-titanium(IV), tris(oxyethyl)amine-isopropoxy-titanium(IV), bis[tris(oxyethyl)amine]diisopropoxy-titanium(IV), bis(2-ethylhexane-1,3-dioxy)-titanium(IV), Tris[2-((2-aminoethyl)amino)-ethoxy]ethoxy-titanium(IV), bis(neopentyl(diallyl)oxy)diethoxy-titanium(IV), titanium(IV) tetrabutanolate, tetra(2-ethylhexyloxy) titanate, tetra(isopropoxy) titanate and polybutyl titanate.

The commercially obtainable types Tyzor® AA, GBA, GBO, AA-75, AA-65, AA-105, DC, BEAT, BTP, TE, TnBT, KTM, TOT, TPT or IBAY (all from Dorf Ketal); Tytan PBT, TET, X85, TAA, ET, S2, S4 or S6 (all from Borica Company Ltd.) and Ken-React® KR® TTS, 7, 9QS, 12, 26S, 33DS, 38S, 39DS, 44, 134S, 138S, 133DS, 158FS or LICA® 44 (all from Kenrich Petrochemicals) are suitable in particular.

In an organotitanate-containing composition the weight ratio between a polymer containing silane groups and the catalyst according to the invention is preferably in the range of from 10/1 to 2,000/1, in particular 20/1 to 2,000/1. The weight ratio between the organotitanate and the catalyst according to the invention is preferably in the range of from 5/1 to 1/50, particularly preferably 2/1 to 1/20, in particular 1/1 to 1/10.

In addition to the catalyst according to the invention, the curable composition can comprise further constituents, in particular the following auxiliary substances and admixtures:

adhesion promoters and/or crosslinking agents, in particular aminosilanes, such as, in particular, 3-aminopropyltrimethoxysilane, 3-aminopropyldimethoxymethylsilane, N-(2-aminoethyl)-3-aminopropyltrimethoxysilane, N-(2-aminoethyl)-3-aminopropyldimethoxymethylsilane, N-(2-aminoethyl)-N'-[3-(trimethoxysilyl)propyl] ethylenediamine or analogues thereof with ethoxy instead of methoxy groups, furthermore N-phenyl-, N-cyclohexyl- or N-alkylaminosilanes, mercaptosilanes, epoxysilanes, (meth)acrylosilanes, anhydridosilanes, carbamatosilanes, alkylsilanes or iminosilanes, oligomeric forms of these silanes, adducts of primary aminosilanes with epoxysilanes or (meth)acrylosilanes or anhydridosilanes, amino-functional alkylsilsesquioxanes, in particular amino-functional methylsilsesquioxane or amino-functional propylsilsesquioxane. 3-Aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, 3-glycidoxypropyl-trimethoxysilane, 3-glycidoxypropyltriethoxysilane or 3-ureidopropyltrimethoxysilane, or oligomeric forms of these silanes, are suitable in particular;
desiccants, in particular tetraethoxysilane, vinyltrimethoxysilane, vinyltriethoxysilane or organoalkoxysilanes which contain a functional group in the a position relative to the silane group, in particular N-(methyldimethoxysilylmethyl) O-methylcarbamate, (methacryloxymethyl)-silanes, methoxymethylsilanes, orthoformic acid esters, calcium oxide or molecular sieves, in particular vinyltrimethoxysilane or vinyltriethoxysilane;

plasticizers, in particular trialkylsilyl-terminated polydialkylsiloxanes, such as, in particular, trimethylsilyl-terminated polydimethylsiloxanes, in particular having viscosities in the range of from 10 to 1,000 mPa·s, or corresponding compounds in which some of the methyl groups are replaced by other organic groups, in particular phenyl, vinyl or trifluoropropyl groups, so-called reactive plasticizers in the form of monofunctional, that is to say unilaterally reactive, polysiloxanes, carboxylic acid esters, such as phthalates, in particular dioctyl phthalate, bis(2-ethylhexyl) phthalate, bis(3-propylheptyl) phthalate, diisononyl phthalate or diisodecyl phthalate, diesters of ortho-cyclohexanedicarboxylic acid, in particular diisononyl 1,2-cyclohexanedicarboxylate, adipates, in particular dioctyl adipate, bis(2-ethylhexyl) adipate, azelates, in particular bis(2-ethylhexyl)azelate, sebacates, in particular bis(2-ethylhexyl) sebacate or diisononyl sebacate, polyols, in particular polyoxyalkylene polyols or polyester polyols, glycol ethers, glycol esters, organic phosphoric or sulfonic acid esters, sulfonic acid amides, polybutenes or fatty acid methyl or ethyl esters derived from natural fats or oils, also called "biodiesel", wherein siloxane-containing plasticizers are particularly suitable for compositions based on silicone polymers;

solvents;

inorganic or organic fillers, in particular natural, ground or precipitated calcium carbonates, which are optionally coated with fatty acids, in particular stearic acid, barite (heavy spar), talcs, quartz flours, quartz sand, dolomites, wollastonites, kaolins, calcined kaolins, mica (potassium aluminum silicate), molecular sieves, aluminum oxides, aluminum hydroxides, magnesium hydroxide, silicas, including highly disperse silicas from pyrolysis processes, industrially produced carbon blacks, graphite, metal powders, such as aluminum, copper, iron, silver or steel, PVC powders or hollow beads;

fibers, in particular glass fibers, carbon fibers, metal fibers, ceramic fibers or fibers of plastic, such as polyamide fibers or polyethylene fibers;

dyestuffs;

pigments, in particular titanium dioxide or iron oxides;

rheology modifiers, in particular thickening agents, in particular laminar silicates, such as bentonites, derivative of castor oil, hydrogenated castor oil, polyamides, polyurethanes, urea compounds, pyrogenic silicas, cellulose ethers or hydrophobically modified polyoxyethylenes;

stabilizers against oxidation, heat, light or UV radiation;

natural resins, fats or oils, such as colophony, shellac, linseed oil, castor oil or soya oil;

non-reactive polymers, such as, in particular, homo- or copolymers of unsaturated monomers, in particular from the group including ethylene, propylene, butylene, isobutylene, isoprene, vinyl acetate or alkyl (meth)acrylates, in particular polyethylenes (PE), polypropylenes (PP), polyisobutylenes, ethylene/vinyl acetate copolymers (EVA) or atactic poly-α-olefins (APAO);

flame retardant substances, in particular the fillers aluminum hydroxide and magnesium hydroxide already mentioned, or in particular organic phosphoric acid esters, such as, in particular, triethyl phosphate, tricresyl phosphate, triphenyl phosphate, diphenyl cresyl phosphate, isodecyl diphenyl phosphate, tris(1,3-dichloro-2-propyl) phosphate, tris(2-chloroethyl) phosphate, tris(2-ethylhexyl) phosphate, tris(chloroisopropyl) phosphate, tris(chloropropyl) phosphate, isopropylated triphenyl phosphate, mono-, bis- or tris (isopropylphenyl) phosphates of varying degree of isopropylation, resorcinol bis(diphenyl phosphate), bisphenol A bis(diphenyl phosphate) or ammonium polyphosphates;

surface-active substances, in particular wetting agents, leveling agents, deaerating agents or defoamers;

biocides, in particular algicides, fungicides or substance which inhibit fungal growth;

and further substances conventionally employed in curable compositions. It may be appropriate to dry certain constituents chemically or physically before mixing into the composition.

In a preferred embodiment the curable composition comprises at least one desiccant and at least one adhesion promoter and/or crosslinking agent.

In a preferred embodiment the curable composition comprises no phthalates as plasticizers. Such compositions are toxicologically advantageous and have few problems with migration effects.

The curable composition is preferably prepared and stored with exclusion of moisture. It is typically storage-stable with exclusion of moisture in a suitable packaging or arrangement, such as, in particular, a bottle, a box, a bag, a bucket, a drum or a cartridge.

The curable composition can be present in the form of a one-component or in the form of a multi-component, in particular two-component, composition.

In the present document "one-component" means a composition in which all the constituents of the composition are stored mixed in the same vessel and which is curable with moisture.

In the present document "two-component" means a composition in which the constituents of the composition are present in two different components which are stored in vessels separated from one another. The two components are mixed with one another only shortly before or during application of the composition, after which the mixed composition cures, where appropriate under the action of moisture.

The curable composition is suitable for a large number of uses, in particular as a paint, lacquer or primer, as a resin for production of fiber composite material (composites), as a rigid foam, flexible foam, molded part, elastomer, fiber, film or membrane, as an embedding composition, sealant, adhesive, covering, coating or paint for construction and industrial uses, for example as a seam seal, hollow cavity seal, electrical insulation composition, knifing filler, joint sealant, weld or raised seam sealant, assembly adhesive, vehicle body adhesive, disk adhesive, sandwich element adhesive, laminating adhesive, laminate adhesive, packaging adhesive, wood adhesive, parquet flooring adhesive, anchoring adhesive, floor covering, floor coating, balcony coating, roof coating, concrete protective coating, parking garage coating, seal, tube coating, anticorrosion coating, textile coating, damping element, sealing element or stopper composition.

The curable composition is particularly suitable as an adhesive and/or sealant, in particular for joint sealing and for elastic adhesive bonds in construction and industrial uses, and as an elastic coating with crack bridging properties, in particular for protecting and/or sealing, for example, roofs, floors, balconies, parking decks or concrete pipes.

Such a composition typically comprises plasticizers, fillers, adhesion promoters and/or crosslinking agents and desiccants, and where appropriate further auxiliary substances and additives.

For use as an adhesive or sealant the curable composition preferably has a paste-like consistency having structure viscosity properties. Such a paste-like sealant or adhesive is applied to a substrate in particular from commercially available cartridges, which are operated manually, by means of compressed air or battery, or from a drum or hobbock by means of a delivery pump or an extruder, where appropriate by means of an application robot.

For use as a coating the curable composition preferably has a consistency which is liquid at room temperature and has self-leveling properties. Where appropriate it is slightly thixotropic, so that the coating can be applied to sloping to vertical surfaces without running away immediately. It is applied in particular by means of a roll or brush or by pouring out and spreading by means of, for example, a roller, a doctor or a spreading comb.

A cured composition is obtained from the curable composition described after curing thereof. The curing is carried out in particular with water, in particular in the form of moisture in the atmosphere, and/or with a suitable crosslinking agent.

From using the curable composition an article which has been in particular glued, sealed or coated with the composition is formed. The article can be in particular a construction, in particular a construction of overground or underground engineering, industrially produced goods or consumer goods, in particular a window, a household machine or a means of transport, such as, in particular, an automobile, a bus, a truck, a track vehicle, a ship, an aircraft or a helicopter, or the article can be an attachment thereto.

A preferred curable composition comprises at least one polymer containing silane groups. Such a composition is also called "silane-crosslinking composition in the following.

The content of polymer containing silane groups in a silane-crosslinking composition is conventionally 10 to 80 wt. %, in particular 15 to 60 wt. %, preferably 15 to 50 wt. %, based on the total weight of the composition. In the case where the silane-crosslinking composition comprises a reactive silicone polymer, both a one-component composition, also called RTV-1, and a two-component composition, also called RTV-2, are preferred. In the case of an RTV-2 composition, the reactive silicone polymer is preferably a constituent of the first component and a silane crosslinking agent, in particular a silane of the formula (XVI), is preferably a constituent of the second component. The catalyst according to the invention can be contained here in the first and/or in the second component.

In the case where the silane-crosslinking composition is an organic polymer containing silane groups, the composition is preferably one-component.

A second or, where appropriate, further components is or are mixed with the first component before or during the application, in particular via a static mixer or via a dynamic mixer.

A silane-crosslinking composition is applied in particular at ambient temperature, preferably in a temperature range between 0 and 45° C., in particular 5 to 35° C., and also cures under these conditions.

During the application the crosslinking reaction of the silane groups starts, where appropriate under the influence of moisture. Silane groups present can undergo a condensation reaction with silanol groups present to form siloxane groups (Si—O—Si groups). Silane groups present can also hydrolyze on contact with moisture to form silanol groups (Si—OH groups) and form siloxane groups (Si—O—Si groups) by subsequent condensation reactions. As a result of these reactions the composition finally cures. The catalyst according to the invention accelerates this curing.

If water is required for the curing, either this can originate from the air (moisture in the atmosphere), or the composition can be brought into contact with a water-containing component, for example by brushing on, for example with a smoothing agent, or by spraying, or water or a water-containing component can be added to the composition during the application, for example in the form of an aqueous or water-releasing liquid or paste. A paste is suitable in particular in the case where the composition itself is present in the form of a paste.

In the case of curing by means of moisture in the atmosphere, the composition cures from the outside inwards, a skin first being formed on the surface of the composition. The so-called skin formation time is a measure of the curing speed of the composition. The speed of the curing is in general determined here by various factors, such as, for example, the availability of water, the temperature etc.

The silane-crosslinking composition typically has a good storage stability without the tendency towards separation, due to the low toxicity and low volatility of the catalyst according to the invention allows a low hazard classification, and renders possible low-emission and low-odor products which cure rapidly and in this context form a mechanically high performance and stable material. The fact that this material scarcely tends towards migration-related defects, such as exudation or substrate contamination, in contrast to compositions comprising catalysts according to the prior art, such as, for example, DBU, TMG or DHA, is particularly advantageous here. Compositions comprising such catalysts tend towards migration effects, which can manifest itself before the curing by separation and after the curing by tacky and/or greasy surfaces and/or substrate contamination. The latter effects in particular are extremely undesirable, since tacky and greasy surfaces rapidly become contaminated and can be poorly brushed over, and substrate contamination can lead to permanent discolorations.

During the application a silane-crosslinking composition is preferably applied to at least one substrate.

Suitable substrates are in particular glass, glass ceramic, concrete, mortar, bricks, tiles, gypsum or natural stones, such as limestone, granite or marble;

metals and alloys, such as aluminum, iron, steel or non-ferrous metals, as well as surface-finished metals or alloys, such as galvanized or chromium-plated metals;

leather, textiles, paper, wood, wood materials bonded with resins, for example phenolic, melamine or epoxy resins, resin-textile composite materials and further so-called polymer composites;

plastics, such as polyvinyl chloride (rigid and flexible PVC), acrylonitrile/butadiene/styrene copolymers (ABS), polycarbonate (PC), polyamide (PA), polyester, poly(methyl methacrylate) (PMMA), epoxy resins, polyurethanes (PU), polyoxymethylene (POM), polyolefins (PO), polyethylene (PE) or polypropylene (PP), ethylene/propylene copolymers (EPM) or ethylene/propylene/diene terpolymers (EPDM), or fiber-reinforced plastics, such as carbon fiber-reinforced plastics (CFRP), glass fiber-reinforced plastics (GFRP) or sheet molding compounds (SMC), wherein the plastics can preferably be surface-treated by means of plasma, corona or flame;

coated substrates, such as powder-coated metals or alloys; paints or lacquers, in particular automobile top lacquers.

If required, the substrates can be pretreated before the application of the composition, in particular by physical and/or chemical cleaning processes or by application of an adhesion promoter, an adhesion promoter solution or a primer.

The silane-crosslinking composition is particularly suitable for contact with substrates which are particularly sensitive to disturbances by migrating substances, in particular by the formation of discolorations or stains. These are in particular fine-pored substrates, such as marble, limestone or other natural stones, gypsum, cement mortar or concrete, but also plastics. On PVC in particular, in the presence of catalysts such as, for example, DBU or TMG marked discolorations are observed which cannot be removed by cleaning. Such effects are not observed with the catalysts according to the invention. The silane-crosslinking composition is particularly suitable as an adhesive and/or sealant or as a coating.

Two substrate of the same type or two different substrates, in particular the abovementioned substrates, can be glued or sealed.

EXAMPLES

Embodiment examples which are intended to explain in more detail the invention described are given in the following. The invention is not of course limited to these embodiment examples described.

"Standard climate" means a temperature of 23±1° C. and a relative atmospheric humidity of 50±5%.

$^1$H-NMR spectra were measured on a spectrometer of the Bruker Ascend 400 type at 400.14 MHz; the chemical shifts δ are stated in ppm relative to tetramethylsilane (TMS). No distinction was made between true and pseudo coupling patterns.

Infrared spectra (FT-IR) were measured on a Nicolet iS5 Thermo Scientific FT-IR apparatus equipped with a horizontal ATR measuring unit with a diamond crystal. Liquid samples were applied undiluted as films, solid samples were dissolved in $CH_2Cl_2$. The absorption bands are stated in wave numbers ($cm^{-1}$; measurement window: 400-650 $cm^{-1}$).

Viscosities were measured on a thermostatically controlled Rheotec RC30 cone-plate viscometer (cone diameter 50 mm, cone angle 1°, cone tip-plate distance 0.05 mm, shear rate 10 $s^{-1}$).

The skin formation time (SFT) was determined by applying a few grams of the composition in a layer thickness of approx. 2 mm to cardboard and measuring in a standard climate the time which elapses, when the surface of the composition is gently tipped by means of a pipette of LDPE, before for the first time residues no longer remain on the pipette.

The nature of the surface was inspected for its haptic properties.

The mechanical properties of tensile strength, elongation at break and E modulus (at 0-5% and at 0-50% elongation) were measured in accordance with DIN EN 53504 at a tensile test speed of 200 mm/min.

The Shore A hardness was determined in accordance with DIN 53505 on test specimens cured for 7 days in the standard climate.

Preparation of Catalysts According to the Invention:

Catalyst K-1: 1,1'-(α,ω-n-Propyl-poly(dimethylsiloxane))-bis(2,3-dicyclohexylguanidine)

16.90 g of α,ω-bis(3-aminopropyl)-poly(dimethylsiloxane) having an average molecular weight of approx. 1,050 g/mol (Wacker® Aminöl SLM 92503, from Wacker; amine number 109 mg of KOH/g) and 6.18 g of N,N'-dicyclohexylcarbodiimide were mixed in a round-bottomed flask and the mixture was heated to 120° C., while stirring. The reaction mixture was analyzed by means of FT-IR spectroscopy at regular intervals. After 17 hours the carbodiimide band at approx. 2120 $cm^{-1}$ had disappeared completely. A colorless, odorless oil having a viscosity at 20° C. of 436 mPa·s was obtained. FT-IR: 2961, 2930, 2855, 1647 (C=N), 1449, 1411, 1364, 1258, 1011, 862, 788, 700.

Catalyst K-2: 1-(α-Propyl-ω-isobutoxy-poly(dimethylsiloxane))-2,3-dicyclohexylguanidine 30.44 g of α-(3-aminopropyl)-ω-isobutoxy-poly(dimethylsiloxane) having an average molecular weight of approx. 1,650 g/mol (Wacker® Aminöl SLM 446011-20 VP, from Wacker; amine number 34 mg of KOH/g) and 3.50 g of N,N'-dicyclohexylcarbodiimide were mixed in a round-bottomed flask and the mixture was heated to 120° C., while stirring. The reaction mixture was analyzed by means of FT-IR spectroscopy at regular intervals. After 17 hours the carbodiimide band at approx. 2120 $cm^{-1}$ had disappeared completely. A yellowish, odorless oil having a viscosity at 20° C. of below 10 mPa·s was obtained.

FT-IR: 2961, 2927, 2852, 1640 (C=N), 1517, 1449, 1410, 1258, 1190, 1074, 1012, 848, 791, 700.

Catalyst K-3

20.0 g of crosslinkable amino-functional poly(dimethylsiloxane) (Wacker® L 655 silicone oil, from Wacker; amine number 78 mg of KOH/g) and 5.25 g of N,N'-dicyclohexylcarbodiimide were mixed in a round-bottomed flask and the mixture was heated to 120° C., while stirring. The reaction mixture was analyzed by means of FT-IR spectroscopy at regular intervals. After 28 hours the carbodiimide band at approx. 2120 $cm^{-1}$ had disappeared completely. A yellowish, odorless oil having a viscosity at 20° C. of 544 mPa·s was obtained. FT-IR: 2961, 2927, 2852, 1640 (C=N), 1517, 1449, 1410, 1258, 1190, 1074, 1012, 848, 791, 700.

Catalyst K-4

20.0 g of non-crosslinkable amino-functional poly(dimethylsiloxane) (Wacker® L 656 silicone oil, from Wacker; amine number 73 mg of KOH/g) and 4.88 g of N,N'-dicyclohexylcarbodiimide were mixed in a round-bottomed flask and the mixture was heated to 120° C., while stirring. The reaction mixture was analyzed by means of FT-IR spectroscopy at regular intervals. After 72 hours the carbodiimide band at approx. 2120 $cm^{-1}$ had disappeared completely. A yellowish, odorless oil having a viscosity at 20° C. of 285 mPa·s was obtained. FT-IR: 2962, 2928, 2853, 1644 (C=N), 1449, 1397, 1258, 1074, 1012, 851, 791, 701.

Catalyst K-5

20.0 g of non-crosslinkable amino-functional poly(dimethylsiloxane) (WACKER® FINISH WT 1650 silicone oil, from Wacker; amine number 34 mg of KOH/g) and 2.25 g of N,N'-dicyclohexylcarbodiimide were mixed in a round-bottomed flask and the mixture was heated to 120° C., while stirring. The reaction mixture was analyzed by means of FT-IR spectroscopy at regular intervals. After 72 hours the carbodiimide band at approx. 2120 cm$^{-1}$ had disappeared completely. A yellowish, odorless oil having a viscosity at 20° C. of 773 mPa·s was obtained.

FT-IR: 2962, 2930, 2855, 1617 (C=N), 1449, 1412, 1258, 1074, 1009, 863, 792, 700.

Catalyst K-6

11.52 g of N-(2-aminoethyl)-3-aminopropyl-functional polysiloxane (Dynasylan® 1146, from Evonik; amine number 243 mg of KOH/g) and 5.16 g of N,N'-dicyclohexylcarbodiimide were mixed in a round-bottomed flask and the mixture was heated to 120° C., while stirring. The reaction mixture was analyzed by means of FT-IR spectroscopy at regular intervals. After 70 hours the carbodiimide band at approx. 2120 cm$^{-1}$ had disappeared completely. Thereafter, 0.17 g of vinyltrimethoxysilane was added. A colorless, odorless oil having a viscosity at 25° C. of 224,000 mPa·s was obtained.

$^1$H-NMR (CDCl$_3$): δ 0.5-0.7 (m, 2H, CH$_2$Si), 1.1-1.4 (m, 12H), 1.55-2.0 (m, 10H), 2.60 (m, 2H, CH$_2$N), 2.73 (m, 2H, CH$_2$N), 3.0-3.1 (m, 1H, NCH$^{Cy}$), 3.10 (m, 2H, CH$_2$N), 3.15-3.27 (m, 1H, NCH$^{Cy}$), 3.47-3.60 (m, approx. 6H, CH$_3$O).

FT-IR: 3269, 2952, 2868, 2840, 1639 (C=N), 1498, 1449, 1409, 1359, 1216, 1191, 1050, 889, 817, 779, 690.

Catalyst K-7: N,N''-(α,ω-Bis(n-propyl)-poly(dimethylsiloxane))bis(N'-hexylacetimidamide)

20.00 g of α,ω-bis(3-aminopropyl)-poly(dimethylsiloxane) having an average molecular weight of approx. 1,050 g/mol (Wacker® Aminöl SLM 92503, from Wacker; amine number 109 mg of KOH/g), 3.82 g n-hexylamine, 4.99 g of trimethyl orthoacetate and 0.20 g of lanthanum(III) trifluoromethanesulfonate were mixed in a round-bottomed flask and the mixture was heated to 180° C. in a microwave apparatus under a maximum pressure of 150 Pa for 40 minutes, while stirring. Thereafter, the reaction mixture was freed from the volatile constituents in vacuo. 25.11 g of a colorless, odorless oil were obtained. FT-IR: 3292, 2960, 2930, 2860, 1653, 1555, 1440, 1412, 1367, 1257, 1188, 1018, 840, 791, 702.

Preparation of Polymers Containing Silane Groups:

Polymer STP-1:

1,000 g of Polyol Acclaim® 12200 (polyoxypropylenediol of low degree of unsaturation, from Bayer; OH number 11.0 mg of KOH/g), 43.6 g of isophorone diisocyanate (IPDI; Vestanat® IPDI, from Evonik), 126.4 g of diisodecyl phthalate (DIDP) and 0.1 g of bismuth tris(neodecanoate) (10 wt. % in DIDP) were heated to 90° C. with constant stirring and under exclusion of moisture and left at this temperature until the titrimetrically determined content of free isocyanate groups had reached a stable value of 0.63 wt. %. 63.0 g of N-(3-trimethoxysilylpropyl)aminosuccinic acid diethyl ester (adduct from 3-aminopropyltrimethoxysilane and maleic acid diethyl ester; prepared according to the instructions in U.S. Pat. No. 5,364,955) were then mixed in and the mixture was stirred at 90° C. until no further free isocyanate was detected by means of FT-IR spectroscopy. The polyether containing trimethoxysilane groups obtained in this way having a silane equivalent weight of approx. 6,880 g/eq (calculated from the amounts employed) was cooled to room temperature and stored with the exclusion of moisture.

Polymer STP-2:

1,000 g of Polyol Acclaim® 12200 (polyoxypropylenediol of low degree of unsaturation, from Bayer; OH number 11.0 mg of KOH/g), 43.6 g of isophorone diisocyanate (IPDI; Vestanat® IPDI, from Evonik), 126.4 g of diisodecyl phthalate (DIDP) and 0.1 g of bismuth tris(neodecanoate) (10 wt. % in DIDP) were heated to 90° C. with constant stirring and under exclusion of moisture and left at this temperature until the titrimetrically determined content of free isocyanate groups had reached a stable value of 0.64 wt. %. 70.6 g of N-(3-triethoxysilylpropyl)aminosuccinic acid diethyl ester (adduct from 3-aminopropyltriethoxysilane and maleic acid diethyl ester) were then mixed in and the mixture was stirred at 90° C. until no further free isocyanate was detected by means of FT-IR spectroscopy. The polyether containing triethoxysilane groups obtained in this way having a silane equivalent weight of approx. 6,920 g/eq (calculated from the amounts employed) was cooled to room temperature and stored with the exclusion of moisture.

Preparation of Silane-Crosslinking Compositions:

Compositions Z1 to Z20 are examples according to the invention, compositions V1 to V12 are comparative examples.

Commercial Catalysts Used and Abbreviations for these:

DBU 1,8-Diazabicyclo[5.4.0]undec-7-ene

TMG 1,1,3,3-Tetramethylguanidine

IBAY Bis(ethylacetoacetato)diisobutoxy-titanium(IV) (Tyzor® IBAY, from Dorf Ketal)

Compositions Z1 to Z8 and Comparisons V1 to V3:

A composition of 96.5 g of polymer STP-1, 0.5 g of vinyltrimethoxysilane and 3.0 g of 3-aminopropyltrimethoxysilane was mixed with various catalysts in the amount stated according to Table 1 and the mixture was tested for viscosity and skin formation time (SFT) in the standard climate, before and after storage. The skin formation time serves here as a measure of the activity of the catalyst with respect to the crosslinking reaction of the silane groups, i.e. of the crosslinking speed; the change in viscosity and skin formation time after storage are a measure of the storage stability. The applied mixture was furthermore tested after 24 hours in the standard climate as to whether the surface was dry as desired or a greasy film had formed, which is an indication of the exudation of the catalyst due to poor compatibility with the cured plastic, and/or whether the surface was tacky, which is an indication of an incomplete curing. A film 2 mm thick was furthermore produced from the mixture, left to cure for 7 days in the standard climate and tested for mechanical properties. The results are reproduced in Table 1 and 2. "Comp." stands for "Composition".

TABLE 1

| Comp. | Catalyst | Amount | Concentration[1] | Viscosity [Pa·s] fresh | stored[2] | increase | SFT fresh | stored[2] |
|---|---|---|---|---|---|---|---|---|
| V1 | DBU | 0.28 g | 1.9 | 27.2 | 36.9 | 36% | 25' | 29' |
| V2 | DBU | 0.04 g | 0.25 | 26.9 | 28.9 | 7% | 54' | 90' |
|  | IBAY | 0.25 g | 0.5 |  |  |  |  |  |
| V3 | TMG | 0.21 g | 1.9 | 22.3 | 24.6 | 10% | 65' | 75' |
| Z1 | K-1 | 1.41 g | 1.9 | 23.4 | 26.4 | 13% | 15' | 17' |
| Z2 | K-1 | 0.04 g | 0.25 | 27.2 | 32.1 | 18% | 48' | 54' |
|  | IBAY | 0.25 g | 0.5 |  |  |  |  |  |
| Z3 | K-3 | 1.82 g | 1.9 | 29.9 | 37.4 | 25% | 20' | 28' |
| Z4 | K-4 | 1.93 g | 1.9 | 28.1 | 36.6 | 30% | 27' | 26' |
| Z5 | K-5 | 3.74 g | 1.9 | 27.1 | 27.3 | 1% | 61' | 64' |
| Z6 | K-6 | 1.24 g | 1.9 | 33.2 | 41.3 | 25% | 13' | 26' |
| Z7 | K-6 | 0.17 g | 0.25 | 28.1 | 31.0 | 10% | 70' | 90' |
|  | IBAY | 0.25 g | 0.5 |  |  |  |  |  |
| Z8 | K-7 | 1.20 g | 1.9 | 28.8 | 30.3 | 5% | 62' | 65' |

[1]mmol of amidine or guanidine groups or metal atoms per 100 g of polymer containing silane groups.
[2]for 7 days at 60° C. in a closed vessel.

TABLE 2

| Comp. | Surface after 24 h | Tensile strength | Elongation at break | E modulus 0-5% | E modulus 0-50% |
|---|---|---|---|---|---|
| V1 | greasy | 0.58 MPa | 72% | 1.16 MPa | 0.77 MPa |
| V2 | dry | 0.66 MPa | 91% | 0.93 MPa | 0.74 MPa |
| V3 | tacky | 0.62 MPa | 90% | 1.19 MPa | 0.75 MPa |
| Z1 | dry | 0.68 MPa | 106% | 1.01 MPa | 0.71 MPa |
| Z2 | dry | 0.75 MPa | 122% | 0.85 MPa | 0.72 MPa |
| Z3 | dry | 0.77 MPa | 150% | 0.90 MPa | 0.66 MPa |
| Z4 | dry | 0.82 MPa | 152% | 0.89 MPa | 0.70 MPa |
| Z5 | dry | 0.66 MPa | 110% | 0.82 MPa | 0.65 MPa |
| Z6 | dry | 0.74 MPa | 102% | 1.17 MPa | 0.81 MPa |
| Z7 | dry | 0.75 MPa | 115% | 0.92 MPa | 0.74 MPa |
| Z8 | almost dry | 0.64 MPa | 92% | 1.10 MPa | 0.78 MPa |

Compositions Z9 to Z12 and Comparisons V4 to V5:

A composition of 95.9 g of polymer STP-2, 0.4 g of vinyltriethoxysilane and 3.7 g of 3-aminopropyltriethoxysilane was mixed with various catalysts in the amount stated according to Table 3 and the mixture was tested as described for composition Z1 for viscosity, skin formation time (SFT) and nature of the surface. The results are reproduced in Table 3 and 4. "Comp." stands for "Composition".

TABLE 3

| Comp. | Catalyst | Amount | Concentration[1] | Viscosity [Pa·s] fresh | stored[2] | increase | SFT fresh | stored[2] |
|---|---|---|---|---|---|---|---|---|
| V4 | DBU | 0.55 g | 3.8 | 48.8 | 58.1 | 19% | 127' | 155' |
| V5 | TMG | 0.42 g | 3.8 | 44.5 | 53.4 | 20% | >12 h | >12 h |
| Z9 | K-1 | 2.80 g | 3.8 | 33.8 | 38.9 | 15% | 79' | 90' |
| Z10 | K-3 | 3.61 g | 3.8 | 27.2 | 38.8 | 43% | 194' | 103' |
| Z11 | K-4 | 3.83 g | 3.8 | 32.1 | 42.6 | 42% | 276' | 127' |
| Z12 | K-6 | 2.43 g | 3.8 | 30.4 | 34.0 | 12% | 121' | 97' |

[1]mmol of amidine or guanidine groups per 100 g of polymer containing silane groups.
[2]for 7 days at 60° C. in a closed vessel.

TABLE 4

| Comp. | Surface after 24 h | Tensile strength | Elongation at break | E modulus 0-5% | E modulus 0-50% |
|---|---|---|---|---|---|
| V4 | greasy, tacky | 0.55 MPa | 152% | 0.48 MPa | 0.44 MPa |
| V5 | very severely tacky | n.d. | n.d. | n.d. | n.d. |

TABLE 4-continued

| Comp. | Surface after 24 h | Tensile strength | Elongation at break | E modulus 0-5% | E modulus 0-50% |
|---|---|---|---|---|---|
| Z9 | dry | 0.66 MPa | 162% | 0.76 MPa | 0.53 MPa |
| Z10 | almost dry | 0.74 MPa | 209% | 0.54 MPa | 0.50 MPa |
| Z11 | almost dry | 0.67 MPa | 191% | 0.55 MPa | 0.46 MPa |
| Z12 | dry | 0.72 MPa | 169% | 0.61 MPa | 0.54 MPa |

"n.d." stands for "not determined" (not measurable)

Compositions Z13 to Z14 and Comparisons V6 to V7:

36.2 g of polymer STP-1 or STP-2, 60.2 g of ground chalk (Omyacarb® 5 GU, from Omya), 1.2 g of thixotropic paste prepared as described below and, in the case of polymer STP-1: 1.2 g of vinyltrimethoxysilane and 1.2 g of 3-aminopropyltrimethoxysilane,
or in the case of polymer STP-2: 1.2 g of vinyltriethoxysilane and 1.2 g of 3-aminopropyltriethoxysilane,
and various catalysts in the amount stated according to Table 5 were mixed in a planetary mixer and the mixer was tested, as described for composition Z1, for skin formation time (SFT) and the nature of the surface. The results are reproduced in Table 5. "Comp." stands for "Composition".

The thixotropic paste was prepared by initially introducing 300 g of diisodecyl phthalate (Palatinol® Z, from BASF) and 48 g of 4,4'-methylenediphenyl diisocyanate (Desmodur® 44 MC L, from Bayer) into a vacuum mixer, gently heating up the mixture and then slowly adding 27 g of n-butylamine dropwise, while stirring vigorously. The paste formed was stirred for a further hour in vacuo and while cooling.

TABLE 5

| Comp. | Polymer | Catalyst, amount | Concentration[1] | SFT | Surface after 24 h | Tensile strength | Elongation at break | E modulus [MPa] 0-5% | E modulus [MPa] 0-100% |
|---|---|---|---|---|---|---|---|---|---|
| V6 | STP-1 | DBU, 0.12 g | 0.8 | 25' | slightly greasy | 2.5 MPa | 103% | 6.1 | 2.8 |
| Z13 | STP-1 | K-1, 0.62 g | 0.8 | 13' | dry | 2.7 MPa | 139% | 5.4 | 2.4 |
| V7 | STP-2 | DBU, 0.40 g | 2.6 | 83' | greasy | 2.5 MPa | 155% | 4.0 | 2.0 |
| Z14 | STP-2 | K-1, 2.00 g | 2.6 | 57' | dry | 3.1 MPa | 246% | 3.3 | 1.6 |

[1]mmol of amidine or guanidine groups per 100 g of composition.

Compositions Z15 to Z17 and Comparisons V8 to V10

71.1 g of an OH-terminated linear polydimethylsiloxane having a viscosity of approx. 50,000 mPas at 23° C. (Wacker® Silicone Rubber Polymer FD 50, from Wacker) were mixed with 2.6 g of vinyl-tris(methylethylketoximo)silane in a round-bottomed flask and the mixture was stirred in vacuo for 15 minutes. 26.3 g of trimethylsilyl-terminated polydimethylsiloxane (Wacker® AK 100 silicone oil, from Wacker) were stirred into the polydimethylsiloxane having vinyl-bis(methylethylketoximo)silyl end groups obtained in this way. This mixture was mixed with various catalysts according to the following Table 6 and the mixture was tested, as described for composition Z1, for viscosity, skin formation time (SFT), the nature of the surface and mechanical properties. The results are reproduced in Table 6 and 7. "Comp." stands for "Composition".

TABLE 6

| Comp. | Catalyst | Amount | Concentration[1] | Viscosity [Pa · s] fresh | Viscosity [Pa · s] stored[2] | Viscosity [Pa · s] increase | SFT fresh | SFT stored[2] |
|---|---|---|---|---|---|---|---|---|
| V8 | DBU | 0.04 g | 0.4 | 18.2 | 15.9 | -13% | 10' | 12' |
| V9 | TMG | 0.03 g | 0.4 | 17.4 | 16.5 | -5% | 23' | 27' |
| V10 | IBAY | 0.13 g | 0.4 | 19.7 | 19.9 | 1% | 27' | 47' |
| Z15 | K-1 | 0.22 g | 0.4 | 17.5 | 16.7 | -5% | 16' | 16' |
| Z16 | K-2 | 0.57 g | 0.4 | 17.4 | 15.7 | -10% | 15' | 16' |
| Z17 | K-7 | 0.25 g | 0.5 | 12.7 | 11.8 | -7% | 23' | 25' |

[1]mmol of amidine or guanidine groups or metal atoms per 100 g of ketoximato-polydimethylsiloxane polymer.
[2]for 7 days at 70° C. in a closed vessel.

TABLE 7

| Comp. | Surface after 24 h | Tensile strength | Elongation at break | E modulus 0-5% | E modulus 0-50% |
|---|---|---|---|---|---|
| V8 | dry | 0.22 MPa | 135% | 0.17 MPa | 0.13 MPa |
| V9 | dry | 0.15 MPa | 86% | 0.17 MPa | 0.16 MPa |
| V10 | dry | 0.25 MPa | 116% | 0.17 MPa | 0.18 MPa |
| Z15 | dry | 0.20 MPa | 188% | 0.18 MPa | 0.15 MPa |
| Z16 | dry | 0.23 MPa | 259% | 0.18 MPa | 0.15 MPa |
| Z17 | dry | 0.23 MPa | 276% | 0.17 MPa | 0.14 MPa |

Compositions Z18 to Z12 and Comparisons V11 to V12

20.2 g of a first component comprising 99 parts by weight (pt. by wt.) of an OH-terminated linear polydimethylsiloxane having a viscosity of approx. 50,000 mPas at 23° C. (Wacker® Silicone Rubber Polymer FD 50, from Wacker) and 1 pt. by wt. of Wacker® E 2 silicone oil emulsion (medium-viscosity OH-terminated linear polydimethylsiloxane emulsified in water under nonionic conditions, from Wacker, solids content 37-40%) were intimately mixed with a second component comprising 0.80 g of vinyltrimethoxysilane and a catalyst of the nature and amount stated in Table 8 in a plastic beaker and the mixture was tested, as described for composition Z1, for skin formation time (SFT) and the nature of the surface. The applied mixture was furthermore tested for Shore A hardness after 7 days in the standard climate. The results are reproduced in Table 8. "Comp." stands for "Composition".

TABLE 8

| Comp. | Catalyst | Amount | Concentration[1] | SFT | Surface after 24 h | Shore A after 7 d |
|---|---|---|---|---|---|---|
| V11 | DBU | 0.06 g | 2.0 | 55' | dry | 3 |
| V12 | IBAY | 0.48 g | 5.0 | 40' | dry | <2 |
| Z18 | K-1 | 0.30 g | 1.9 | 10' | dry | 3 |
| Z19 | K-2 | 0.75 g | 1.9 | 7' | dry | 4 |
| Z20 | K-3 | 0.40 g | 2.0 | 10' | dry | 6 |
| Z21 | K-4 | 0.43 g | 2.0 | 10' | dry | 6 |

[1]mmol of amidine or guanidine groups or metal atoms per 100 g of OH-terminated polydimethylsiloxane Composition Z22 (In Situ Preparation of the Catalyst):

A composition of 30.0 g of polymer STP-1 and 0.15 g of vinyltrimethoxysilane was mixed with 2.0 g of α,ω-bis(3-aminopropyl)-poly(dimethylsiloxane) having an average molecular weight of approx. 1,050 g/mol (Wacker® Aminöl SLM 92503, from Wacker; amine number 109 mg of KOH/g) and 0.4 g of N,N'-diisopropylcarbodiimide with exclusion of moisture and the mixture was transferred into an aluminum tube lacquered on the inside and heated to 80° C. in an oven. After the intervals of time stated in Table 9 the mixture was tested for skin formation time (SFT) in the standard climate and for the conversion of the carbodiimide (via the decrease in intensity of the carbodiimide band at approx. 2120 cm$^{-1}$ in FT-IR, intensity at the start=0% conversion, band no longer detectable=100% conversion). The results are reproduced in Table 9.

TABLE 9

| Time | SFT | Carbodiimide conversion |
|---|---|---|
| 0 h | 3 h 15' | 0% |
| 2 h | 32' | 22% |
| 4 h | 19' | 50% |
| 6 h | 15' | 74% |
| 24 h | 14' | 100% |

The invention claimed is:

1. A catalyst comprising at least one amidine or guanidine group of the formula (Ia) or (Ib) which is bonded to a silicon atom of a siloxane radical

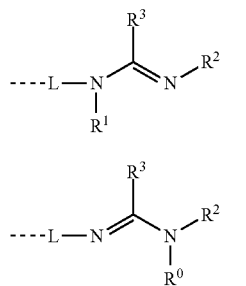

wherein

L represents a linear or branched, divalent hydrocarbon radical having 1 to 20 C atoms, which optionally contains one or more nitrogen atoms, R$^1$ and R$^0$ independently of each other each represent a hydrogen radical or an alkyl or cycloalkyl or aralkyl radical having 1 to 8 C atoms, R$^2$ represents a hydrogen radical or an alkyl, cycloalkyl or aralkyl radical having 1 to 18 C atoms, which optionally contains hetero atoms and which optionally contains terminal primary or secondary amino groups, R$^3$ represents —NHR$^5$ or a hydrogen radical or an alkyl, cycloalkyl or aralkyl radical having 1 to 12 C atoms, R$^5$ represents a hydrogen radical or an alkyl, cycloalkyl or aralkyl radical having 1 to 18 C atoms, which optionally contains hetero atoms, wherein R$^1$ together with R$^2$ can also represent an alkylene radical having 2 to 6 C atoms, R$^0$ together with R$^2$ can also represent an alkylene radical having 3 to 6 C atoms, which optionally contains hetero atoms, R$^2$ together with R$^3$ can also represent an alkylene radical having 3 to 6 C atoms and R$^2$ together with R$^5$ can also represent an alkylene radical having 2 to 12 C atoms, wherein the siloxane radical is a polysiloxane radical A$^1$, which contains at least one structural unit of the formula

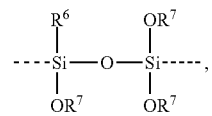

in which an amidine or guanidine group of the formula (Ia) or (Ib) is bonded directly to the dialkoxy-substituted silicon atom of this structural unit, and wherein R$^6$ represents a monovalent hydrocarbon radical having 1 to 12 C atoms and R$^7$ represents a monovalent hydrocarbon radical having 1 to 4 C atoms.

2. A catalyst as claimed in claim 1, wherein the polysiloxane radical has an average molecular weight in the range of from 206 to 50,000 g/mol.

3. A catalyst as claimed in claim 1, wherein R$^3$ represents a hydrogen radical or an alkyl, cycloalkyl or aralkyl radical having 1 to 12 C atoms.

4. A process for the preparation of a catalyst as claimed in claim 3, wherein at least one siloxane-amine is reacted with at least one ortho ester or at least one 1,3-keto ester or at least one nitrile.

5. A catalyst as claimed in claim 1, wherein R$^3$ represents —NHR$^5$,

R$^2$ and R$^5$ independently of each other each represent an alkyl, cycloalkyl or aralkyl radical having 1 to 18 C atoms, which optionally contains hetero atoms, and R$^1$ represents a hydrogen radical.

6. A process for the preparation of a catalyst as claimed in claim 5, wherein at least one siloxane-amine is reacted with at least one carbodiimide of the formula R$^5$—N═C═N—R$^2$.

7. A process for catalyzing a composition, comprising adding the catalyst as claimed in claim 1 to a composition comprising a moisture-curable polymer, and exposing the resulting composition to water.

8. The process as claimed in claim 7, wherein the composition is an adhesive, a sealant or a coating.

9. A curable composition comprising at least one catalyst as claimed in claim 1.

10. A curable composition as claimed in claim 9, wherein it additionally comprises at least one polymer containing silane groups.

11. A curable composition as claimed in claim 10, wherein the polymer containing silane groups is selected from the group consisting of polysiloxanes having terminal silane groups and organic polymers containing silane groups.

12. A catalyst comprising at least one amidine or guanidine group of the formula (Ia) or (Ib) which is bonded to a silicon atom of a siloxane radical

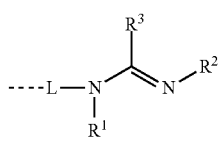

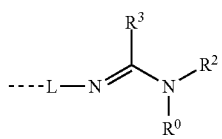

wherein

L represents a linear or branched, divalent hydrocarbon radical having 1 to 20 C atoms, which optionally contains one or more nitrogen atoms, $R^1$ and $R^0$ independently of each other each represent a hydrogen radical or an alkyl or cycloalkyl or aralkyl radical having 1 to 8 C atoms, $R^2$ represents a hydrogen radical or an alkyl, cycloalkyl or aralkyl radical having 1 to 18 C atoms, which optionally contains hetero atoms and which optionally contains terminal primary or secondary amino groups, $R^3$ represents —$NHR^5$ or a hydrogen radical or an alkyl, cycloalkyl or aralkyl radical having 1 to 12 C atoms, $R^5$ represents a hydrogen radical or an alkyl, cycloalkyl or aralkyl radical having 1 to 18 C atoms, which optionally contains hetero atoms, wherein $R^1$ together with $R^2$ can also represent an alkylene radical having 2 to 6 C atoms, $R^0$ together with $R^2$ can also represent an alkylene radical having 3 to 6 C atoms, which optionally contains hetero atoms, $R^2$ together with $R^3$ can also represent an alkylene radical having 3 to 6 C atoms and $R^2$ together with $R^5$ can also represent an alkylene radical having 2 to 12 C atoms, wherein the siloxane radical is a polysiloxane radical $A^2$ of the formula (II)

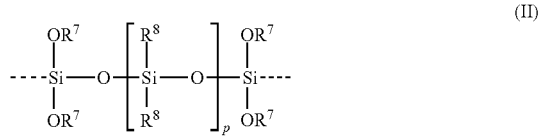
(II)

and wherein p represents an integer in the range of from 1 to 60, $R^7$ represents a monovalent hydrocarbon radical having 1 to 4 C atoms and $R^8$ represents a monovalent hydrocarbon radical having 1 to 12 C atoms.

13. A catalyst as claimed in claim 12, wherein the polysiloxane radical has an average molecular weight in the range of from 206 to 50,000 g/mol.

14. A catalyst as claimed in claim 12, wherein $R^3$ represents a hydrogen radical or an alkyl, cycloalkyl or aralkyl radical having 1 to 12 C atoms.

15. A process for the preparation of a catalyst as claimed in claim 14, wherein at least one siloxane-amine is reacted with at least one ortho ester or at least one 1,3-keto ester or at least one nitrile.

16. A catalyst as claimed in claim 12, wherein $R^3$ represents —$NHR^5$, $R^2$ and $R^5$ independently of each other each represent an alkyl, cycloalkyl or aralkyl radical having 1 to 18 C atoms, which optionally contains hetero atoms, and $R^1$ represents a hydrogen radical.

17. A process for the preparation of a catalyst as claimed in claim 16, wherein at least one siloxane-amine is reacted with at least one carbodiimide of the formula $R^5$—N=C=N-$R^2$.

18. A process for catalyzing a composition, comprising adding the catalyst as claimed in claim 12 a composition comprising a moisture-curable polymer, and exposing the resulting composition to water.

19. The process as claimed in claim 18, wherein the composition is an adhesive, a sealant or a coating.

20. A curable composition comprising at least one catalyst as claimed in claim 12.

21. A curable composition as claimed in claim 20, wherein it additionally comprises at least one polymer containing silane groups.

22. A curable composition as claimed in claim 21, wherein the polymer containing silane groups is selected from the group consisting of polysiloxanes having terminal silane groups and organic polymers containing silane groups.

* * * * *